(12) United States Patent
Koiwai

(10) Patent No.: US 8,374,513 B2
(45) Date of Patent: Feb. 12, 2013

(54) OPTICAL RECEIVER AND JITTER TOLERANCE CONTROL METHOD

(75) Inventor: Yasushi Koiwai, Kawasaki (JP)

(73) Assignee: Fujitsu Optical Component Limited, Kawasaki (JP)

( * ) Notice: Subject to any disclaimer, the term of this patent is extended or adjusted under 35 U.S.C. 154(b) by 234 days.

(21) Appl. No.: 12/662,470

(22) Filed: Apr. 19, 2010

(65) Prior Publication Data

US 2010/0316394 A1 Dec. 16, 2010

(30) Foreign Application Priority Data

Jun. 15, 2009 (JP) .................. 2009-142505

(51) Int. Cl.
*H04B 10/08* (2006.01)
*H04B 10/06* (2006.01)

(52) U.S. Cl. .......... 398/208; 398/27; 398/33; 398/209

(58) Field of Classification Search .......... 398/25–27, 398/33, 202, 208–210
See application file for complete search history.

(56) References Cited

U.S. PATENT DOCUMENTS

| | | | | |
|---|---|---|---|---|
| 7,877,023 B2 * | 1/2011 | Uto | ...... | 398/202 |
| 2002/0063937 A1 * | 5/2002 | Kikuchi | ...... | 359/189 |
| 2007/0081827 A1 * | 4/2007 | Ide et al. | ...... | 398/209 |

FOREIGN PATENT DOCUMENTS

| | | |
|---|---|---|
| JP | 2000-134160 | 5/2000 |
| JP | 2008-517552 | 5/2008 |

* cited by examiner

*Primary Examiner* — Dalzid Singh
(74) *Attorney, Agent, or Firm* — Staas & Halsey LLP

(57) ABSTRACT

An optical receiver includes an optical device that receives input light and converts the input light to an electric signal; an equalizer that carries out waveform shaping on the electric signal; an amplifier that amplifies the electric signal; a discrimination part that discriminates data of the electric signal; an input optical power detecting part that detects input optical power of the input light; and a control part that makes an error rate in the electric signal with respect to the input optical power worse when the input optical power detected by the input optical power detecting part is equal to or less than a value corresponding to minimum receiver sensitivity.

14 Claims, 24 Drawing Sheets

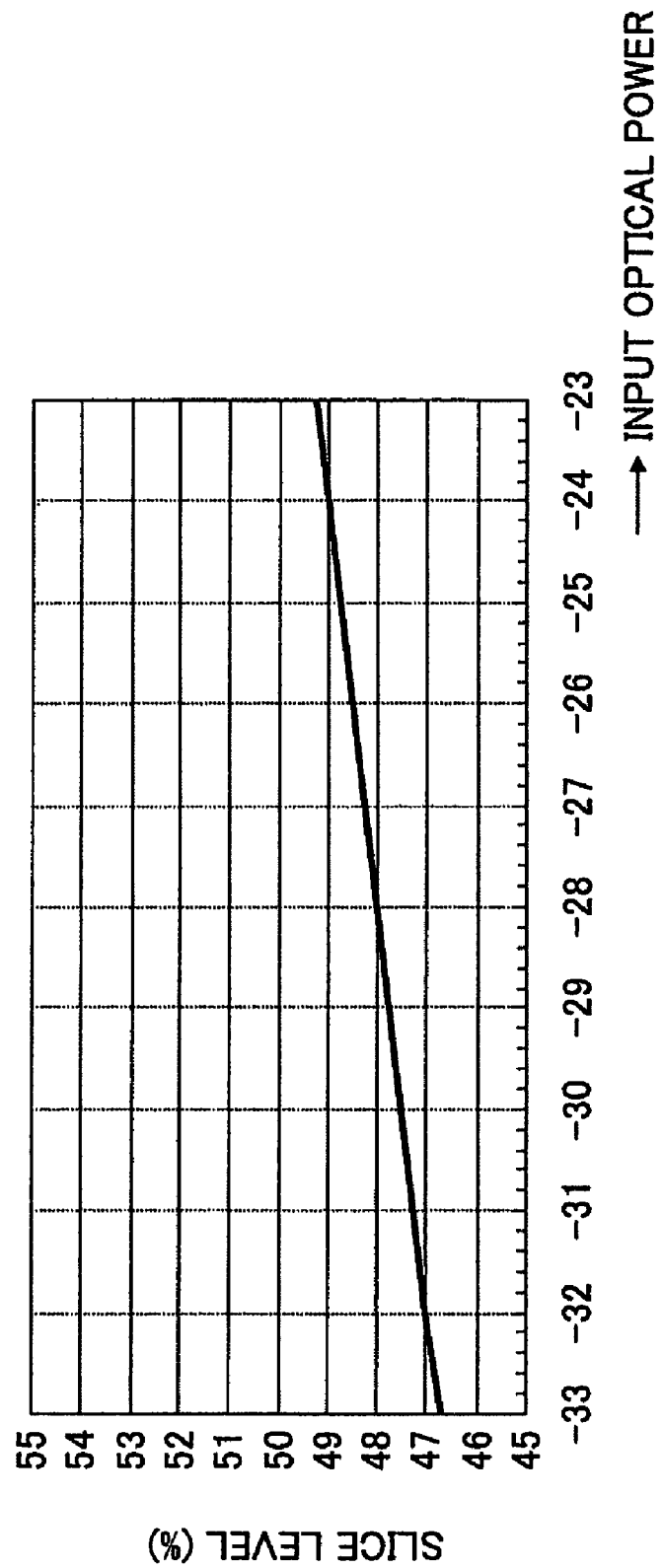

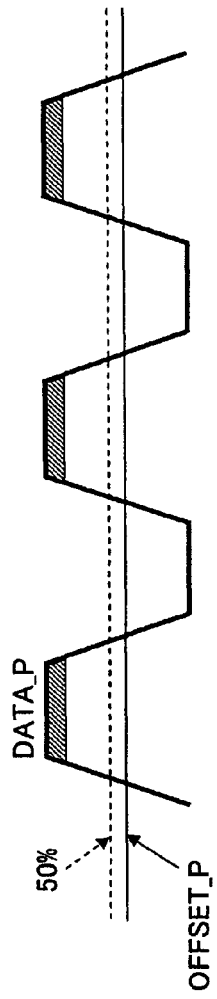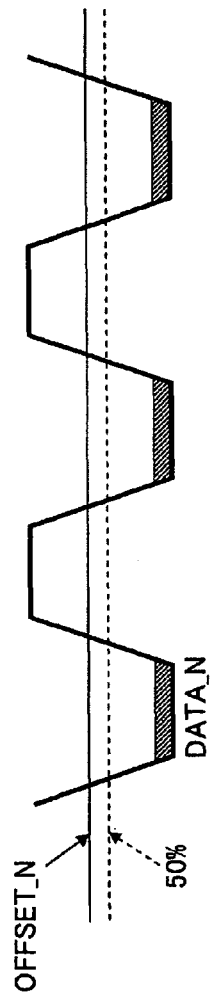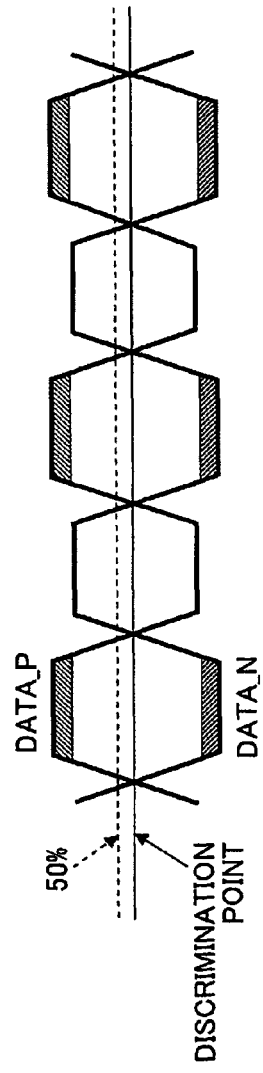

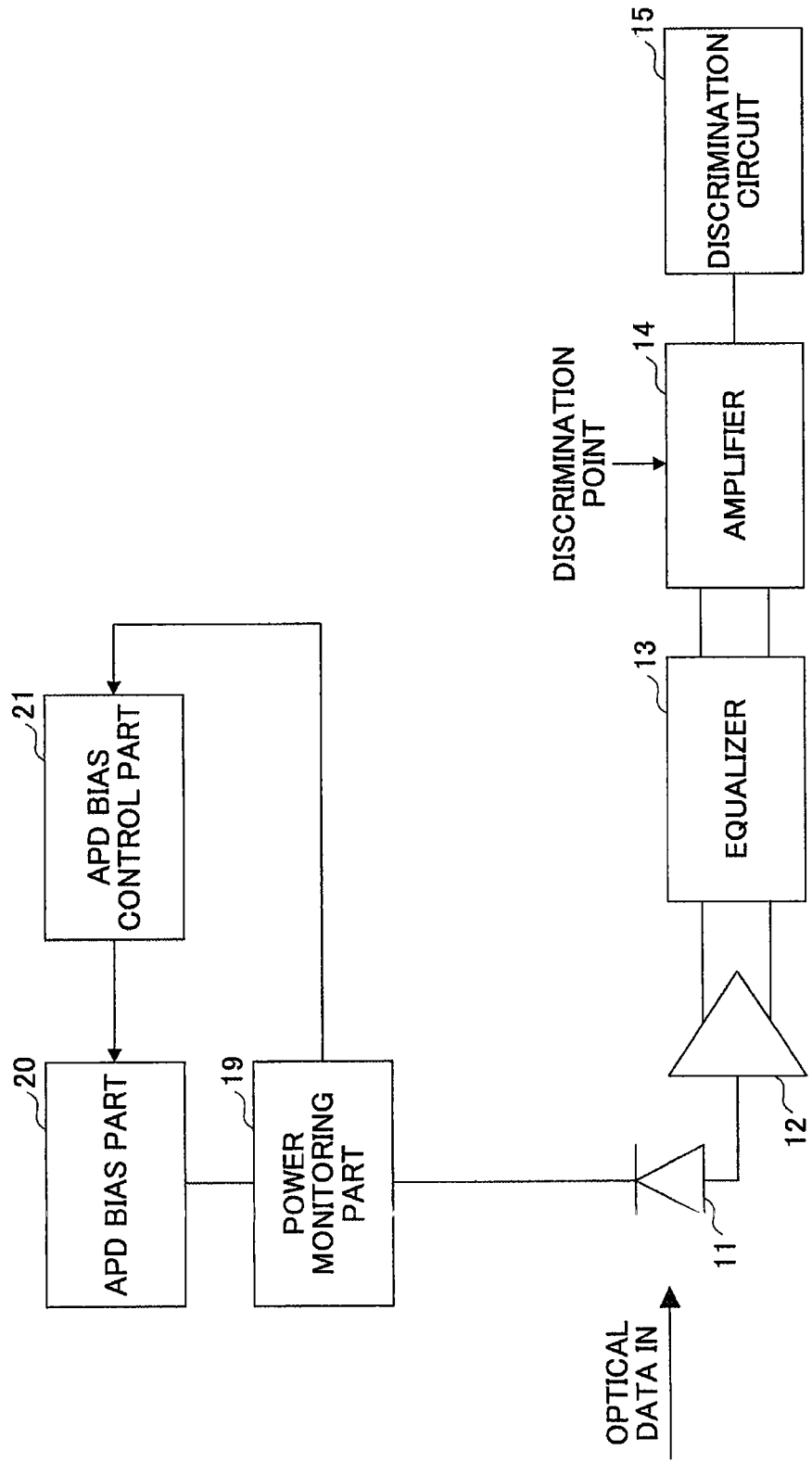

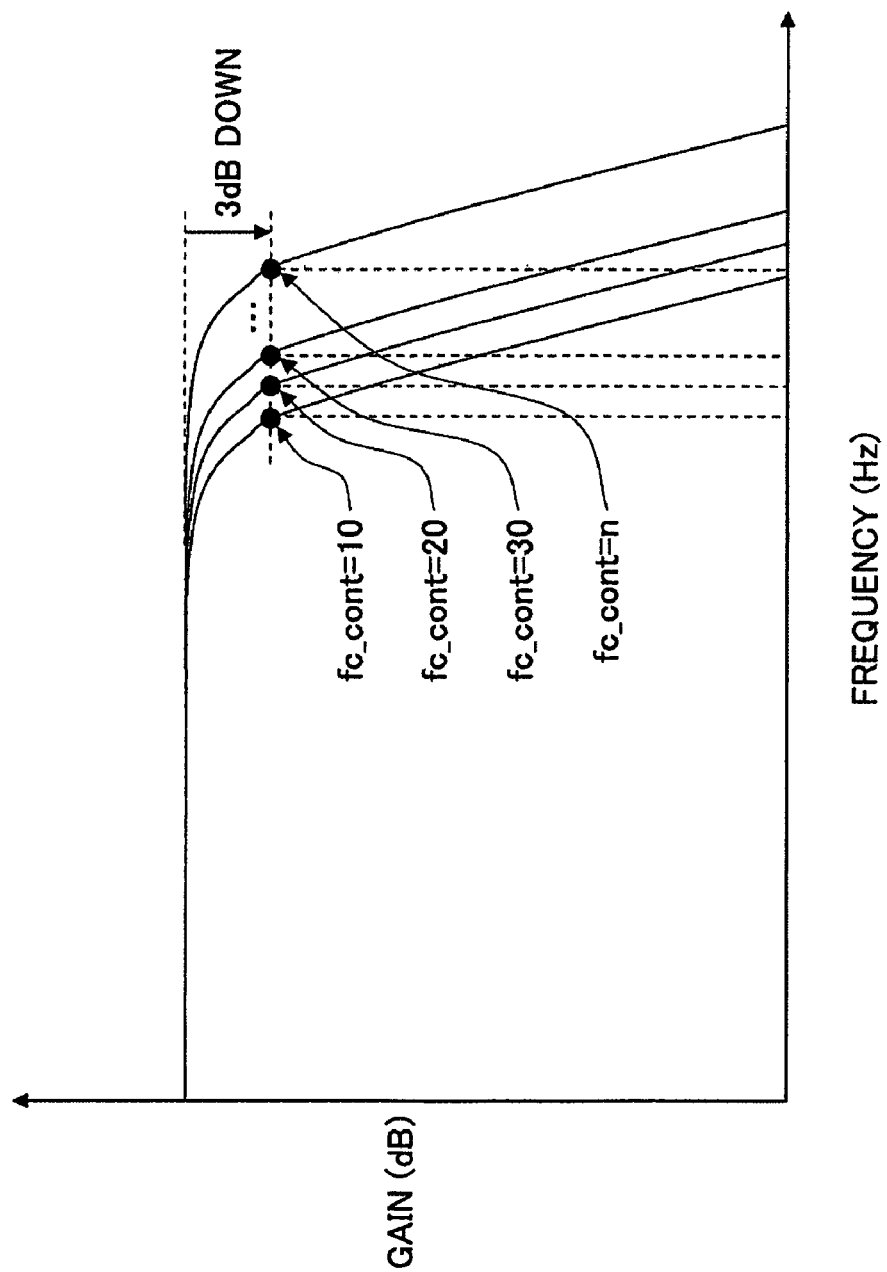

OPTICAL RECEIVER AND JITTER TOLERANCE CONTROL METHOD

CROSS-REFERENCE TO RELATED APPLICATIONS

This application is based upon and claims the benefit of priority of Japanese Patent Application No. 2009-142505, filed on Jun. 15, 2009, the entire contents of which are incorporated herein by reference.

FIELD

The embodiment discussed herein is directed to an optical receiver that controls jitter tolerance and a jitter tolerance control method.

BACKGROUND

Japanese Laid-Open Patent Application No. 2000-134160 discusses an optical receiver in which tailing of bit error characteristics is reduced and receiving characteristics are improved, and a method of receiving an optical signal that achieves improved receiving characteristics.

Japanese Laid-Open Patent Application No. 2008-517552 discusses an optical receiver that has a device which changes a determination threshold level and an optical transmission system having the optical receiver.

SUMMARY

The present disclosure aims at providing an optical receiver that includes an optical device configured to receive input light and convert the input light to an electric signal; an equalizer configured to carry out waveform shaping on the electric signal; an amplifier configured to amplify the electric signal; a discrimination part configured to discriminate data of the electric signal; an input optical power detecting part configured to detect input optical power of the input light; and a control part configured to make an error rate in the electric signal with respect to the input optical power worse when the input optical power detected by the input optical power detecting part is equal to or less than a value corresponding to minimum receiver sensitivity.

It is to be understood that both the foregoing general description and the following detailed description are exemplary and explanatory and are not restrictive of the invention, as claimed.

BRIEF DESCRIPTION OF DRAWINGS

FIGS. 1A and 1B are characteristic diagrams illustrating a first related art case;

FIGS. 8A, 8B and 8C are waveform diagrams illustrating the example in FIG. 7;

FIG. 9 is a configuration diagram of a third embodiment of an optical receiver;

FIGS. 18A and 18B are characteristic diagrams illustrating the example in FIG. 17.

DESCRIPTION OF EMBODIMENTS

First, jitter tolerance will be described.

Jitter tolerance is prescribed in a 1 dB penalty method in ITU-T (International Telecommunication Union-Telecommunication Sector) GR-253 standard, and jitter tolerance characteristics are preferably ensured in a zone in which SN (Signal to Noise ratio) for light is low, based on the standard.

The 1 dB penalty method for jitter tolerance in the ITU-T GR-253 standard is a method in which, in order to control receiver sensitivity degradation occurring due to jitter tolerance to be equal to or less than 1 dB, jitter tolerance is measured in a condition in which input optical power that is greater than a jitter tolerance measurement threshold by 1 dB is input. That is, input optical power greater than a jitter tolerance measurement threshold by 1 dB is input and jitter is applied, and measurement is carried out until a BER (Bit Error Rate) becomes equal to the jitter tolerance measurement threshold. The thus-measured tolerance is jitter tolerance.

Minimum receiver sensitivity is also prescribed in ITU-T GR-253 standard as BER=$1\times10^{-12}$ (simply referred to as 1E-12, hereinafter). Further, a request from an end user may become more difficult to achieve than the standard value. Therefore, the minimum receiver sensitivity is preferably lowered more.

For this purpose, the following setting methods may be used. In one setting method, in order to ensure the minimum receiver sensitivity, a discrimination point in an optical receiving unit is fixed at an optimum point for a fixed input optical power. In another setting method, a discrimination point is changed to be an optimum point according to input optical power. For these setting methods, see the above-mentioned Japanese Laid-Open Patent Application No. 2000-134160 and Japanese Laid-Open Patent Application No. 2008-517552, for example.

In a case where jitter tolerance characteristics may not be ensured in the above-mentioned setting method in which a discrimination point is changed according to input optical power, minimum receiver sensitivity is preferably increased, for the purpose of ensuring the jitter tolerance characteristics.

Figure 1B:
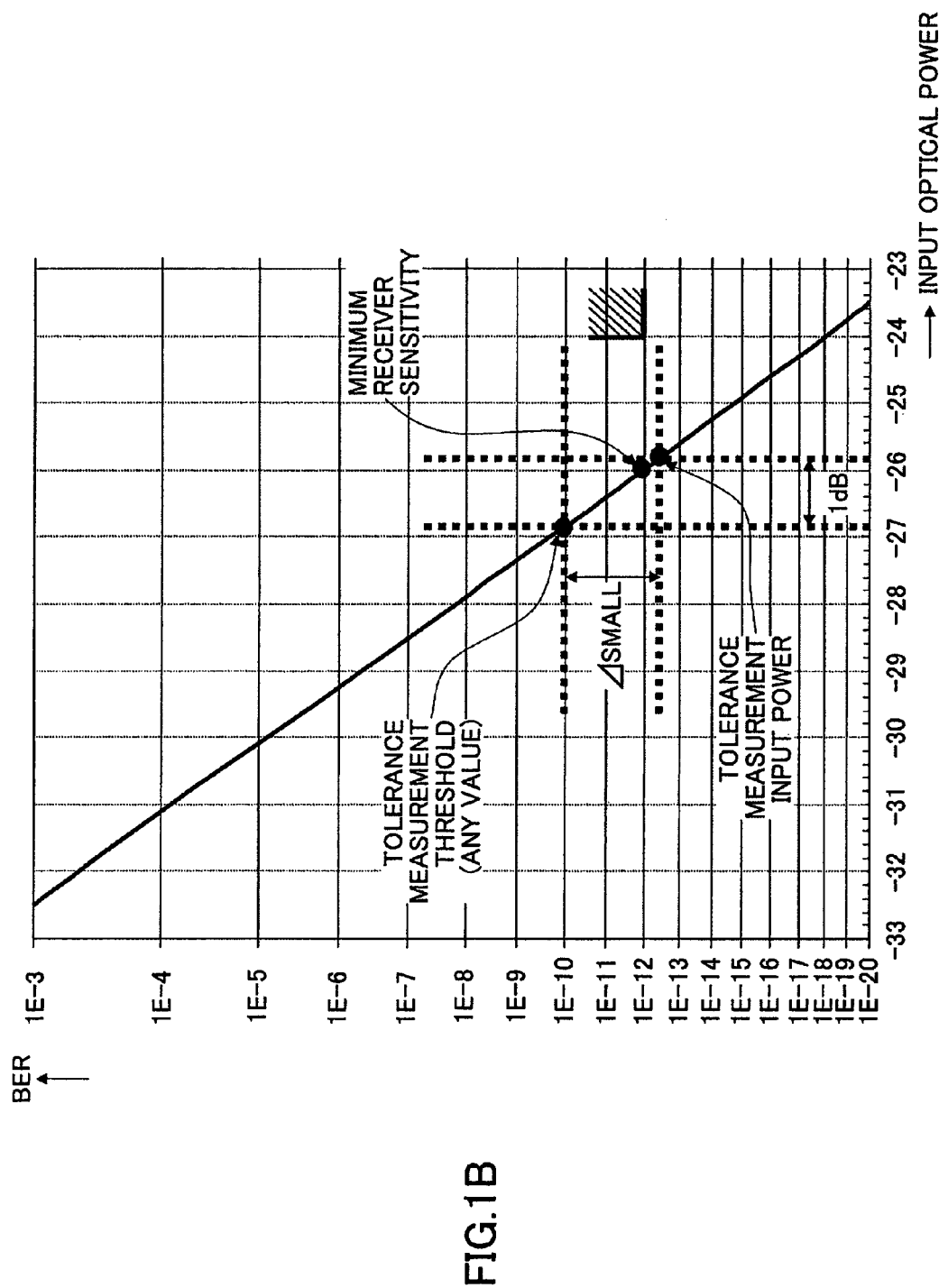

A first related art case will now be described with reference to FIGS. 1A and 1B. As depicted in FIG. 1A, a slice level [%] is increased as input optical power increases, and thus, a discrimination point (slice level) is made to become an optimum point. It is noted that, in an eye aperture waveform depicted in FIG. 2, the slice level means a percentage with respect to input optical power. In an avalanche photodiode (APD) as an optical device, noise is likely to occur on a high level side of input optical power. Therefore, a slice level is set to be equal to or less than 50%, and the slice level is reduced as input optical power falls.

In FIG. 1B, an abscissa axis denotes input optical power and an ordinate axis denotes BER. It is noted that, in FIG. 1B, an upper side indicates an increase or a degradation of BER. In FIG. 1B, an "L" letter indicates a minimum receiver sensitivity of the standard (BER=1E-12) for when input optical power of an optical signal of 10 Gbps is −24 dB. A solid line in FIG. 1B denotes input optical power/BER characteristics in a case where a discrimination point is changed to be an optimum point according to input optical power. Here, for example, BER=1E-10 is determined as a measurement threshold in the input optical power/BER characteristics, input optical power greater by 1 dB than input optical power at the measurement threshold is input, and jitter tolerance is measured.

Figure 3A:
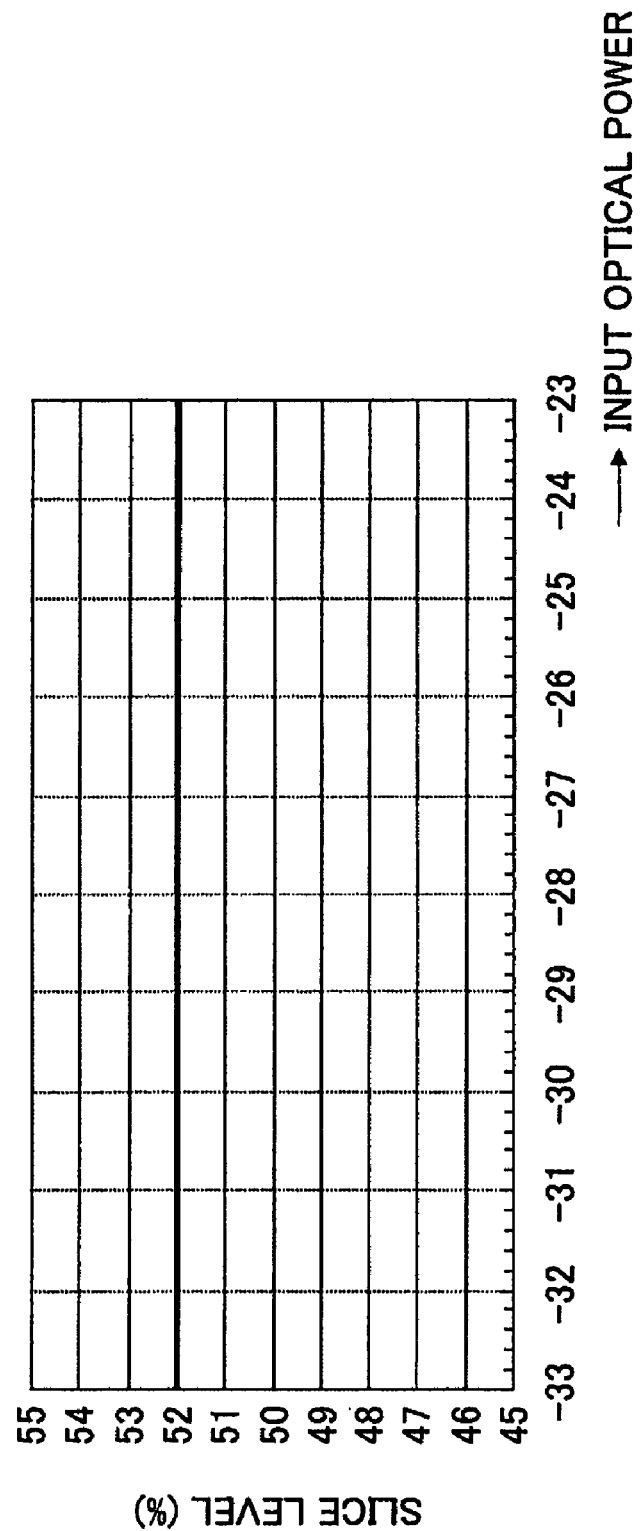
FIGS. 3A and 3B are characteristic diagrams illustrating a second related art case.
Figure 3B:
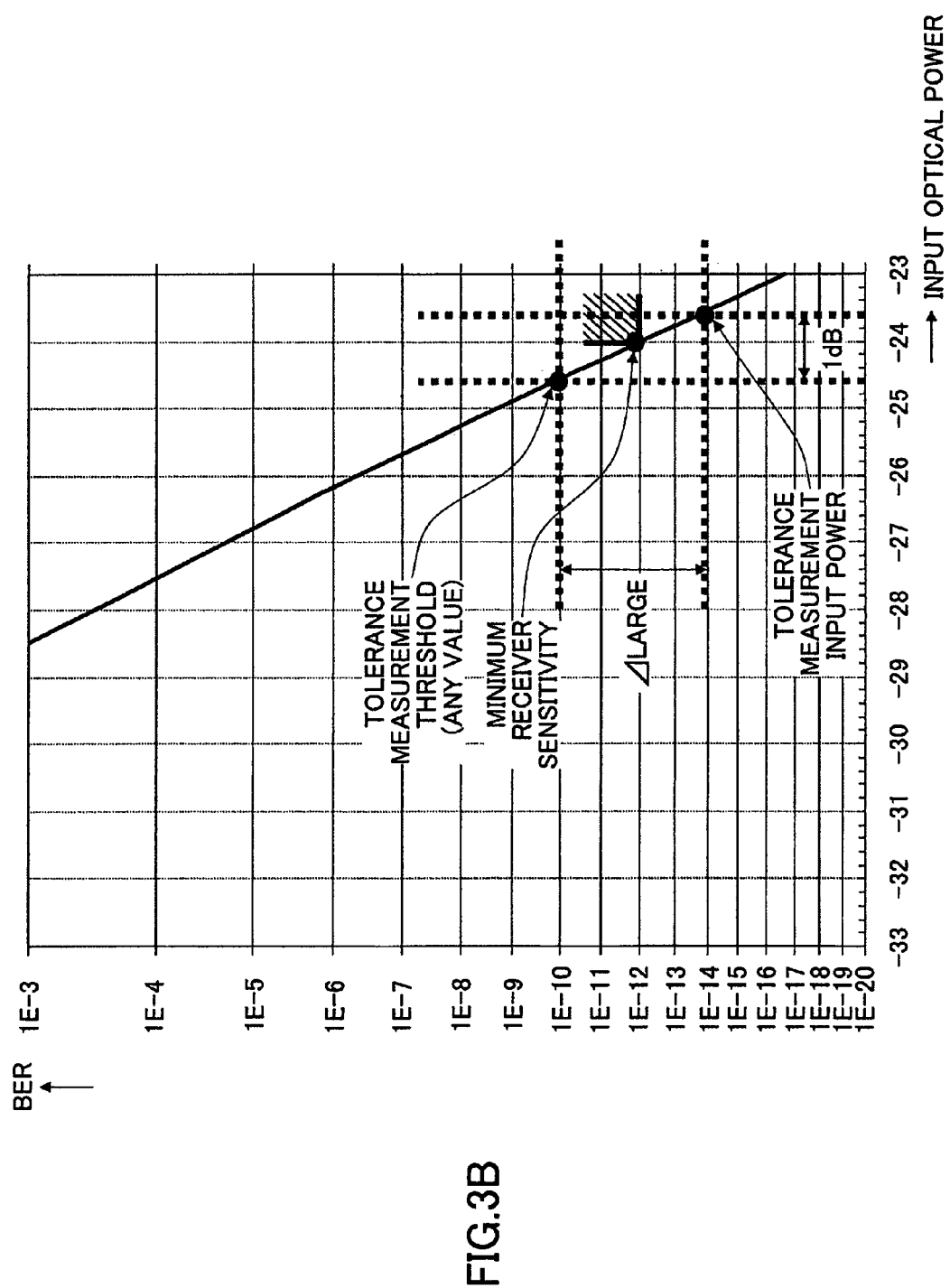

With reference to FIGS. 3A and 3B, a second related art case will now be described. As depicted in FIG. 3A, a discrimination point (slice level) is fixed and independent of input optical power in a condition in which the discrimination point (slice level) is higher than an optimum point, and thus, becomes worse.

In FIG. 3B, an abscissa axis denotes input optical power and an ordinate axis denotes BER. In FIG. 3B, an "L" letter indicates a minimum receiver sensitivity of the standard (BER=1E-12) for when input optical power of an optical signal of 10 Gbps is −24 dB. In a case where jitter tolerance characteristics may not be ensured, the discrimination point (slice level) is increased to be higher than the optimum point, minimum receiver sensitivity is thus allowed to be made worse, and the minimum receiver sensitivity is caused to become approximately equal to the minimum receiver sensitivity of the standard. Thus, input optical power at a jitter tolerance measurement threshold (BER=1E-10) is increased, and thereby, input optical power increased by 1 dB becomes increased accordingly. As a result, S/N of light is improved as much as possible, and jitter tolerance characteristics are ensured.

In the above-mentioned first related art case of FIGS. 1A and 1B, minimum receiver sensitivity is improved. However, input optical power at the jitter tolerance measurement threshold (BER=1E-10) becomes smaller, and therewith, input optical power increased by 1 dB becomes smaller accordingly. Therefore, a state in which S/N of light is low occurs, and as a result, an opening in an eye aperture of an input waveform in an optical receiving unit becomes smaller, and it may be difficult to ensure jitter tolerance characteristics.

In the second related art case described above with reference to FIGS. 3A and 3B, as mentioned above, minimum receiver sensitivity is allowed to be made worse for the purpose of improving jitter tolerance characteristics.

The optical receivers in the embodiments of the present invention ensure jitter tolerance characteristics without making minimum receiver sensitivity worse.

Next, with reference to figures, the embodiments of the present invention will be described.

First and Second Embodiments

Figure 4:
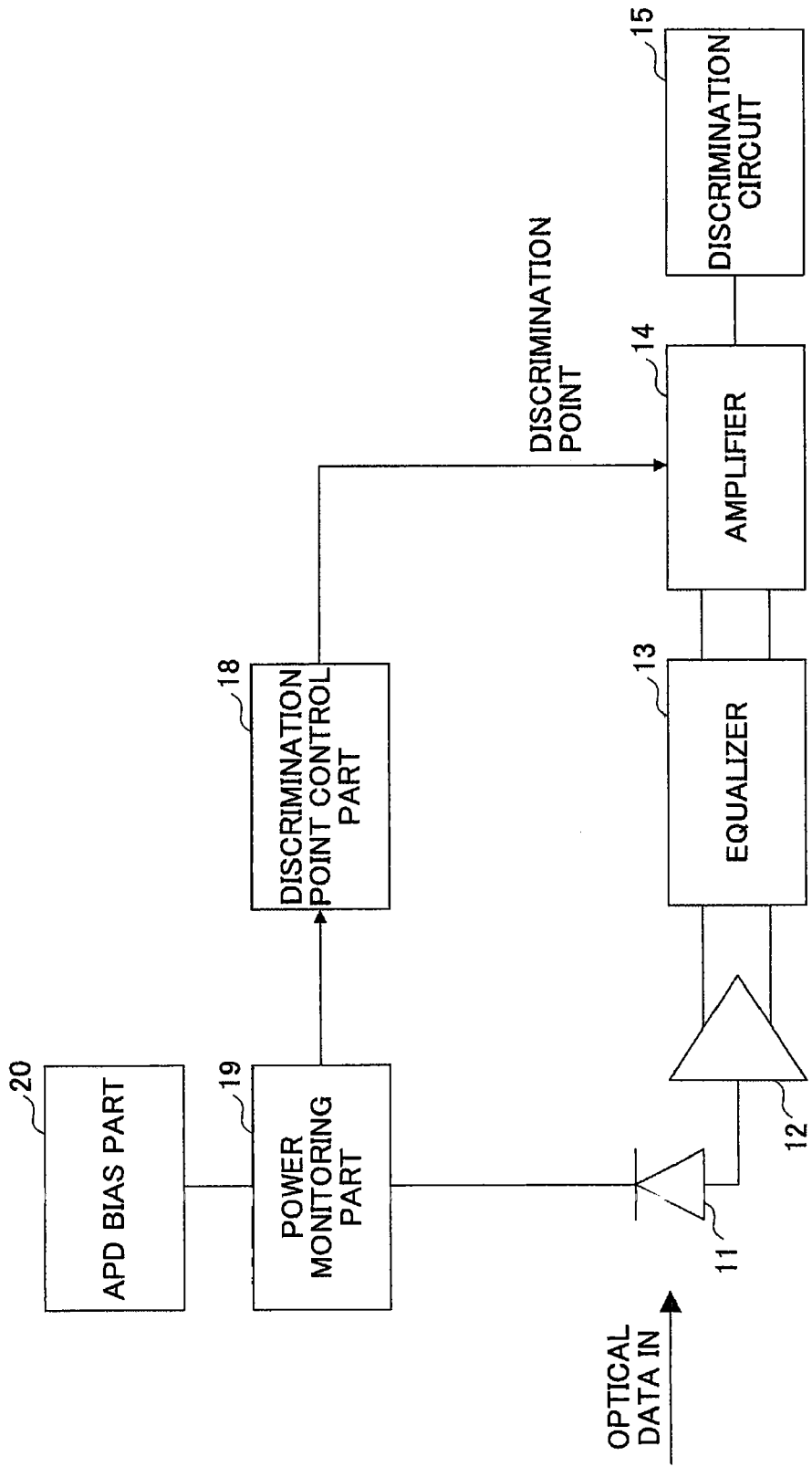
FIG. 4 is a configuration diagram of a first embodiment of an optical receiver.
Figure 5:
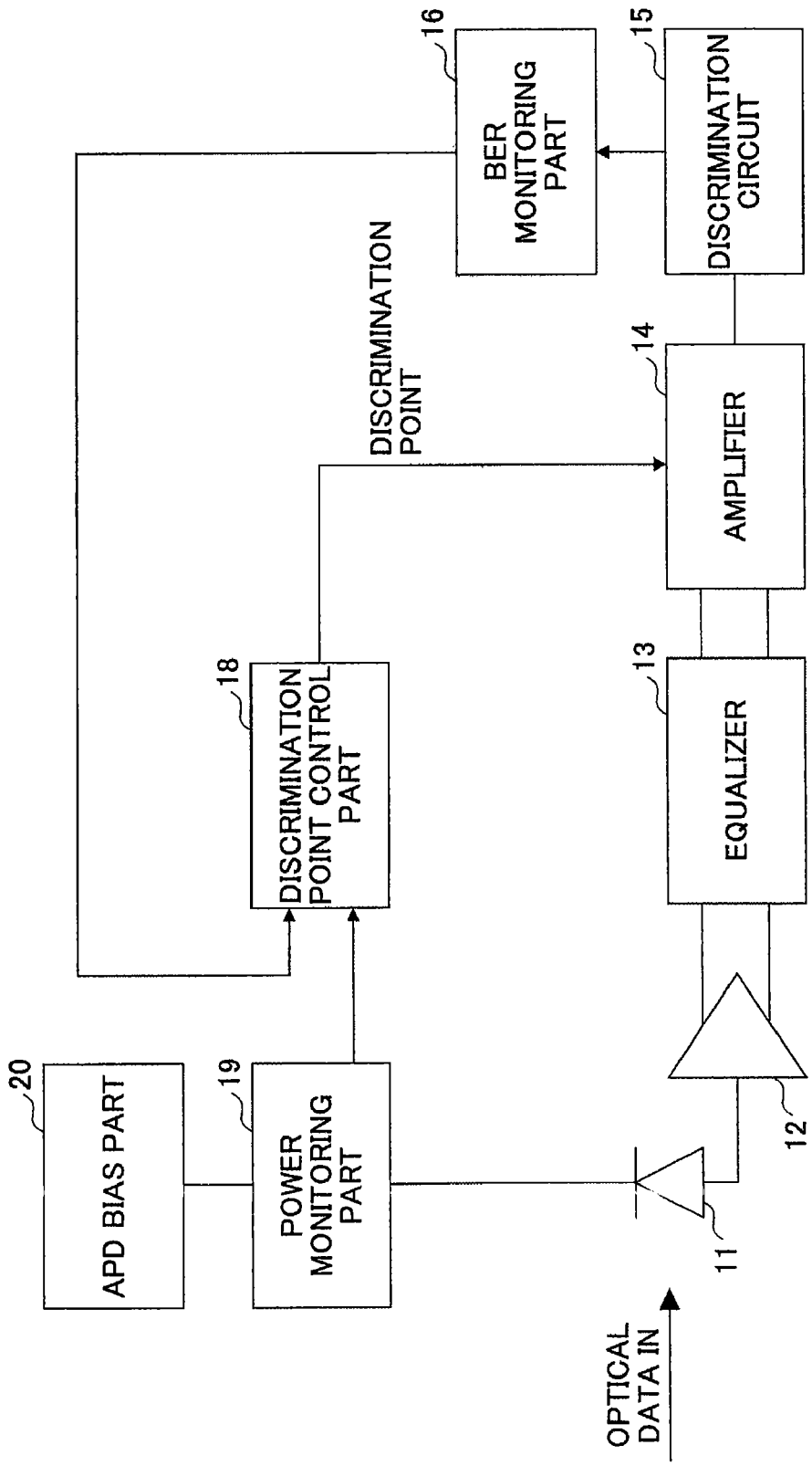
FIG. 5 is a configuration diagram of a second embodiment of an optical receiver.

FIG. 4 depicts a configuration of a first embodiment of an optical receiver. FIG. 5 depicts a configuration of a second embodiment of an optical receiver. In FIGS. 4 and 5, the same reference numerals are given to identical parts/components.

In FIG. 4, an optical device 11 is, for example, an avalanche photodiode, receives an optical input signal, converts the optical input signal to an electric signal (received signal), and provides the received signal to a pre-amplifier 12. The pre-amplifier 12 amplifies the received signal, and provides the received signal to an equalizer 13.

The equalizer 13 carries out waveform shaping on the received signal, and provides the received signal to an amplifier 14. The amplifier 14 is a limiter amplifier, discriminates a value (1 or 0) or data of the received signal by using a discrimination point provided by a discrimination point control part 18, and provides the received signal to the discrimination circuit 15. The discrimination circuit 15 extracts a clock signal from the received signal, takes the value of the received signal provided by the amplifier 14 at timing of the clock signal, and outputs thus-taken value (1 or 0) as data.

On the other hand, the optical device 11 driven by an APD bias voltage provided by an APD bias part 20 has an electric current signal that changes according to strength of the optical input signal. Therefore, a power monitoring part 19 monitors power of the optical input signal by using the electric current signal, and provides the monitored power of the optical input signal (power monitoring information) to a discrimination point control part 18.

Figure 6A:
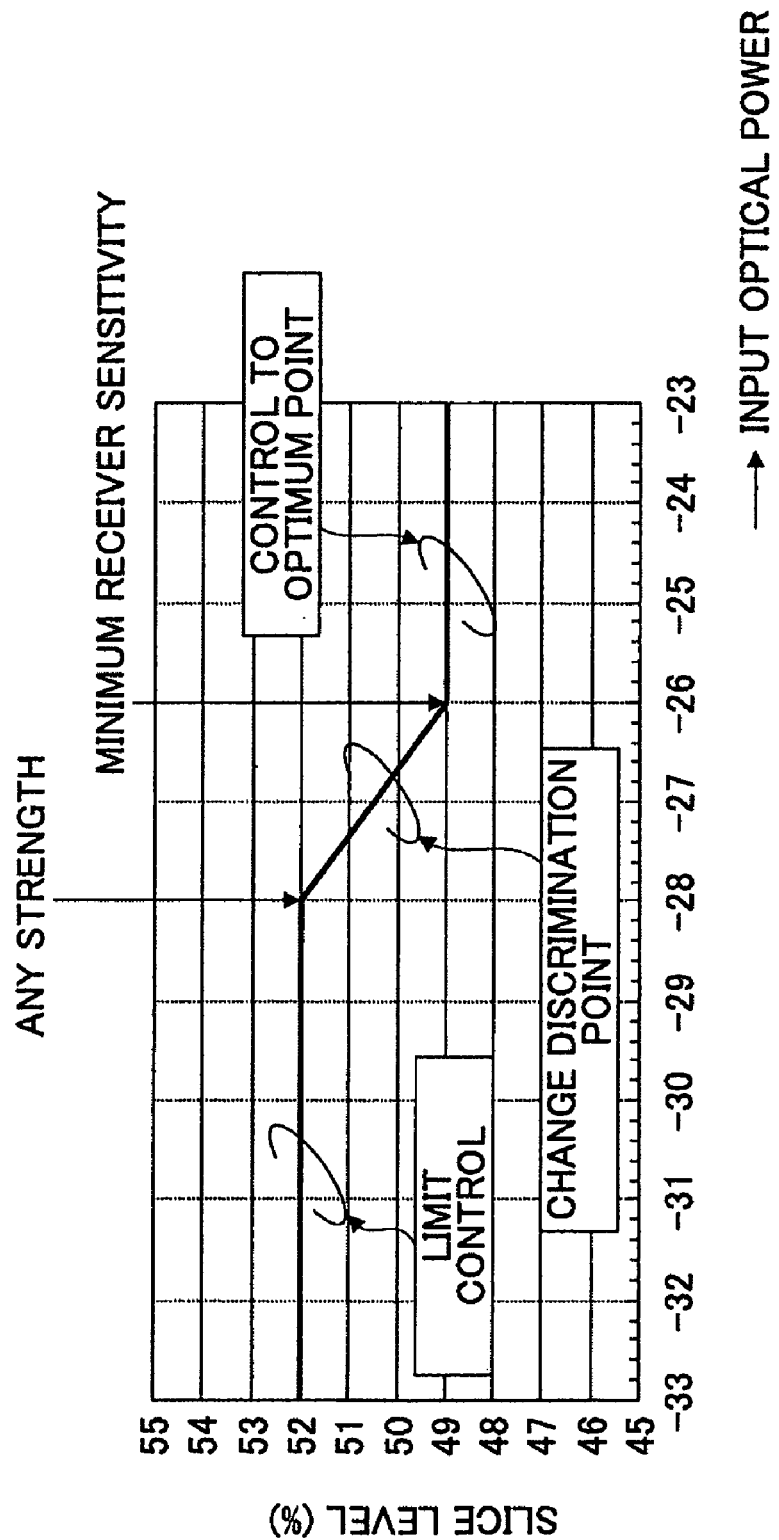
FIGS. 6A and 6B are characteristic diagrams illustrating the first and second embodiments.

The discrimination point control part 20 changes the discrimination point according to the power monitoring information of the input light (input optical signal) and provides the discrimination point to the amplifier 14. For example, as depicted in FIG. 6A, for the input optical power (power of the input optical signal or the input light) of −26 dB or more, the discrimination point is controlled to be an optimum point (a slice level is 49%). The input optical power=−26 dB is a value corresponding to a BER value (=1E-12) at minimum receiver sensitivity for when the discrimination point is controlled to be the optimum point (see FIG. 6B). For the input optical power from −26 dB to −28 dB (predetermined value), the slice level is increased from 49% to 52% according to the input optical power, and thus, the discrimination point is shifted from the optimum point. For the input optical power equal to or less than −28 dB (predetermined value), the slice level is fixed at 53%, and thus, limit control is carried out.

In the second embodiment depicted in FIG. 5, the discrimination circuit 15 provides the data discriminated by the discrimination circuit 15, to a BER monitoring part 16. The BER monitoring part 16 calculates a BER of the provided data, and provides the BER information to the discrimination control part 18.

The discrimination control part 18 then changes the discrimination point according to the power monitoring information of the input light and the BER information of the discriminated data, and provides the discrimination point to the amplifier 14. For example, as depicted in FIG. 6A, the discrimination point is controlled to be the optimum point (the slice level is 49%), for the BER equal to or less than 1E-12 (see FIG. 6B). When the BER exceeds 1E-12 and thus becomes worse, the slice level is changed from 49% to 52% according to the input optical power, to the input optical power of −28 dB (predetermined value). For the input optical power equal to or less than −28 dB (predetermined value), limit control is carried in which the slice level is fixed at 52%.

That is, in the first and second embodiments, the discrimination point control part 18 carries out control as follows: In a case where the input optical power is lower than sensitivity (minimum receiver sensitivity) at which a specific error level (BER=1E-12) is obtained, the discrimination point in the amplifier 14 is shifted from the optimum point, and thus, the input optical power/BER characteristics are made worse (the absolute value of the inclination is increased). It is noted that, in the first and second embodiments, instead of thus shifting the discrimination point (slice level) from the optimum discrimination point in such a direction to increase the slice level as mentioned above, the discrimination point (slice level) may be shifted from the optimum point in such a direction to decrease the slice level.

Figure 6B:
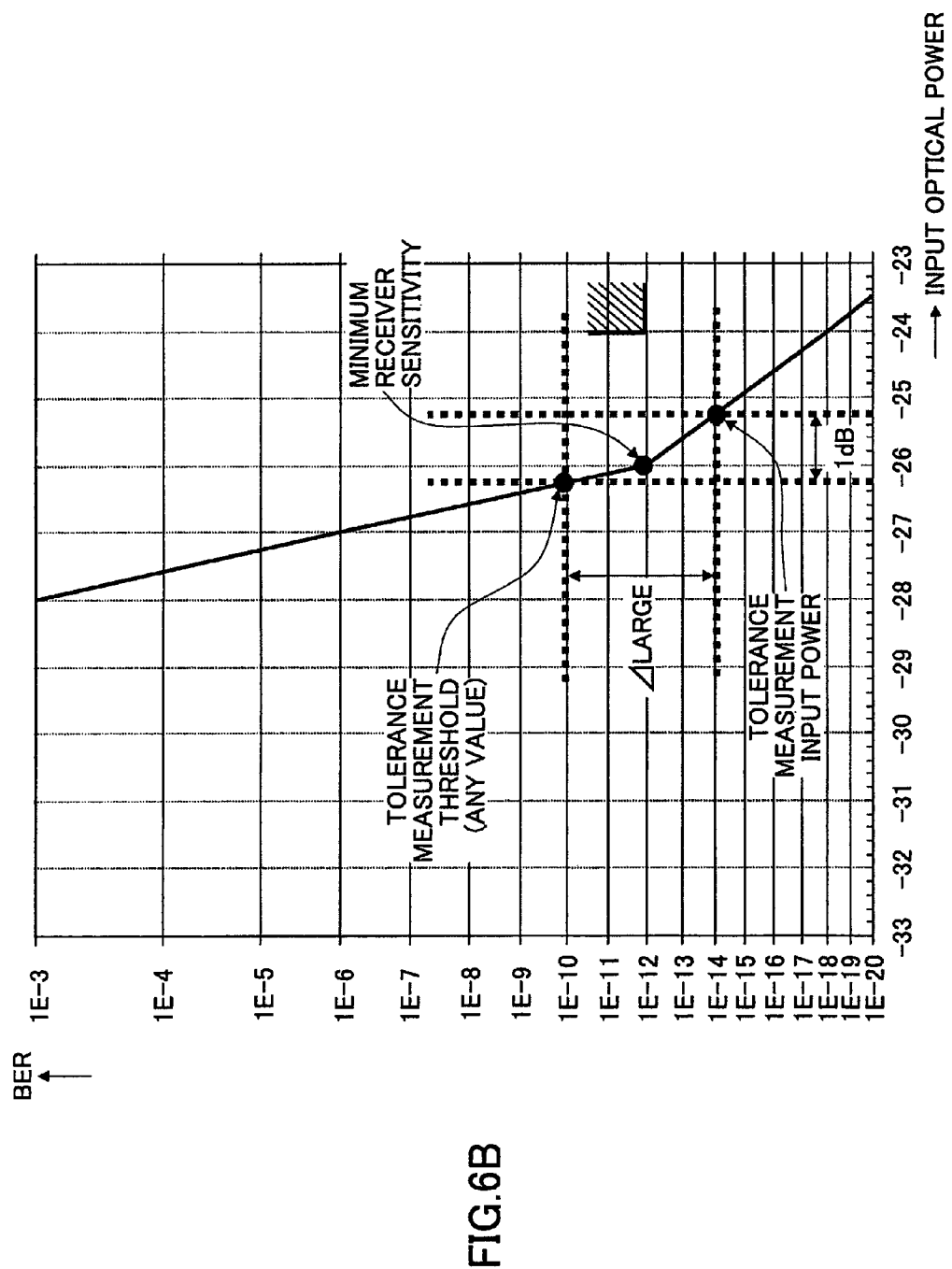

In the first and second embodiments, a solid line depicted in FIG. 6B denotes the input optical power/BER characteristics. An L-letter depicted in FIG. 6B denotes minimum receiver sensitivity (BER=1E-12) of the standard at which the input optical power of the optical signal of 10 Gbps is −24 dB.

In the input optical power/BER characteristics of FIG. 6B, the minimum receiver sensitivity is ensured through control of the discrimination point control part 18 in which the discrimination point is controlled to be the optimum point for the input optical power equal to or more than −26 dB in which the BER is equal to or less than the BER value (=1E-12) at the minimum receiver sensitivity.

A jitter tolerance measurement threshold may be set to be larger (worse) than the BER value (=1E-12) at the minimum receiver sensitivity. Therefore, the input optical power at the jitter tolerance measurement threshold and the input optical power of a jitter tolerance measurement point may be increased accordingly. As a result, a difference in the BER may be increased between the jitter tolerance measurement threshold (tolerance measurement threshold) and the input optical power of the jitter tolerance measurement point (tolerance measurement input power). Thus, the jitter tolerance characteristics may be improved.

When the input optical power is equal to or less than the minimum receiver sensitivity and also, is equal to or less than the predetermined value (=−28 dB), or the BER is equal to or more than a second error level (=1E-3), the discrimination control part 18 controls the slice level to 52% for the purpose of avoiding an out-of-synchronization state of a main signal, otherwise occurring due to an increase of the BER, and ensures the minimum receiver sensitivity.

Figure 7:
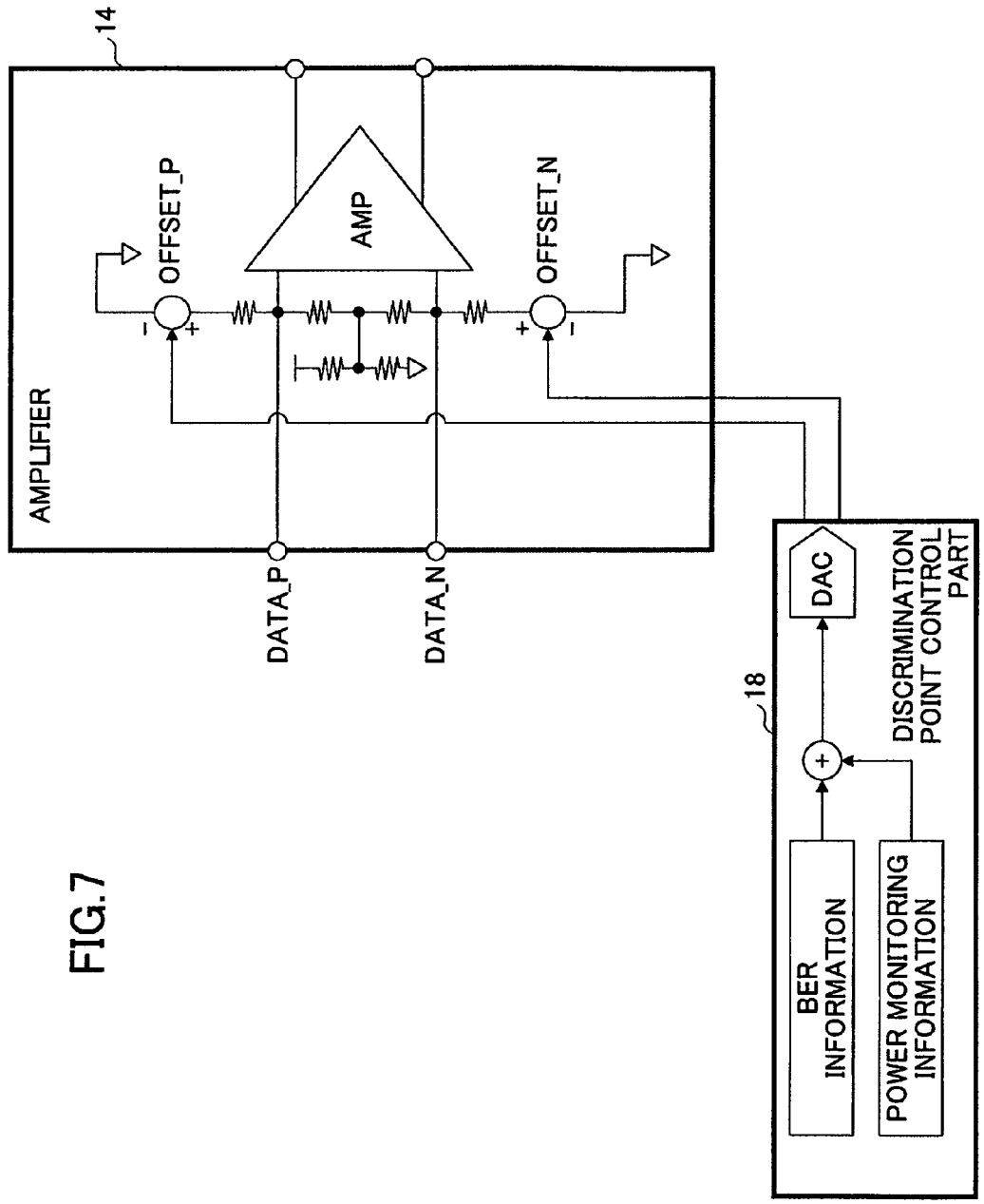
FIG. 7 is a detailed configuration diagram of one example of an amplifier and a discrimination point control part.

FIG. 7 depicts a detailed configuration of one example of the amplifier 14 and the discrimination point control part 18 depicted in FIG. 5. In FIG. 7, the discrimination point control part 18 controls input offset voltages of the amplifier 14 based on the power monitoring information of the input light and the BER information. That is, the discrimination point control part 18 outputs an OFFSET_P voltage signal and an OFFSET_N voltage signal based on the power monitoring information and the BER information.

In the amplifier 14, as depicted in FIG. 8A, the OFFSET_P voltage is added to a DATA_P signal that is one of differential input signals. Further, as depicted in FIG. 8B, the OFFSET_N voltage is added to a DATA_N signal that is the other of the differential input signals. Thereby, it is possible to change the discrimination point for the differential input signals including the DATA_P signal and the DATA_N signal; as depicted in FIG. 8C.

Third and Fourth Embodiments

Figure 10:
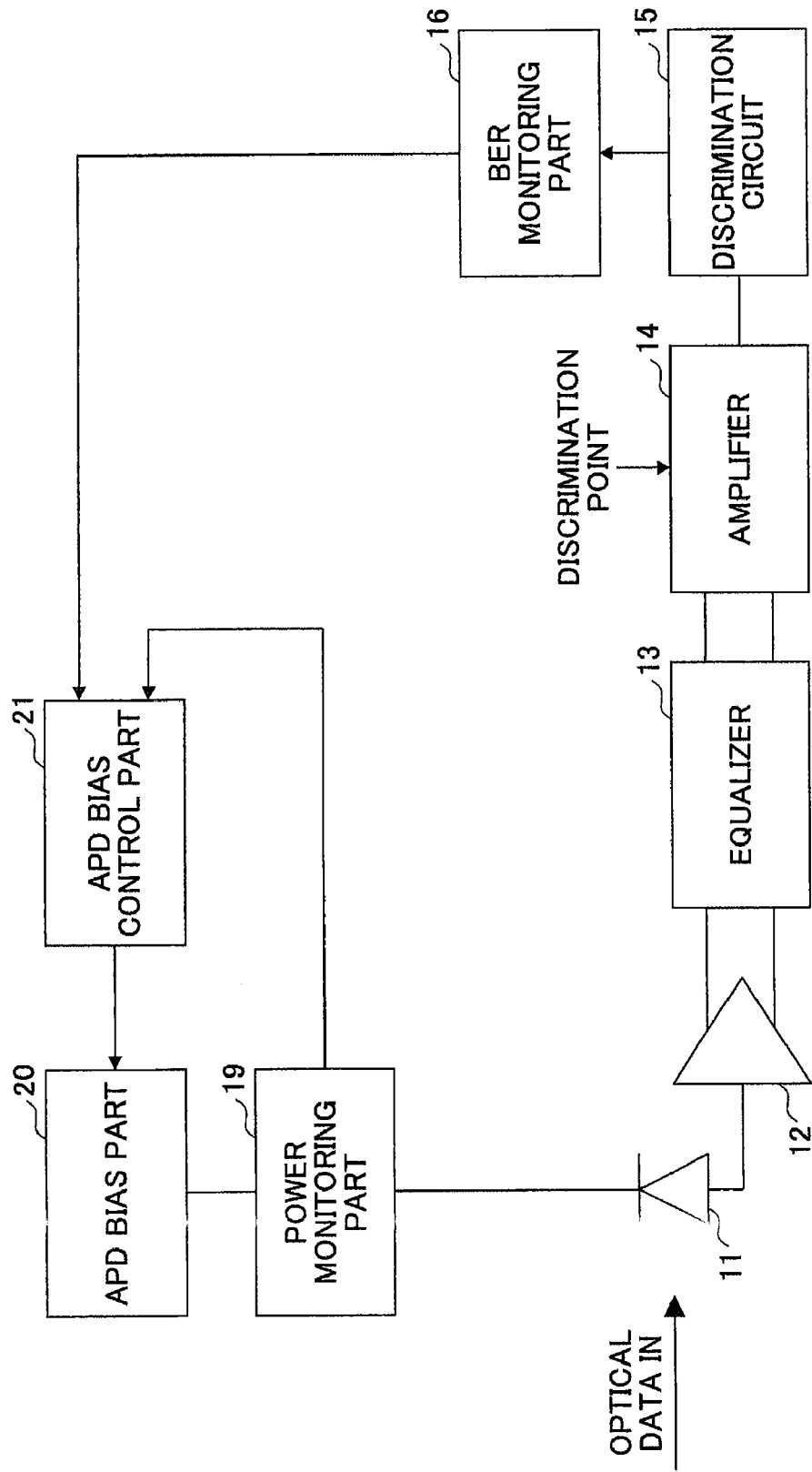
FIG. 10 is a configuration diagram of a fourth embodiment of an optical receiver.

FIG. 9 depicts a configuration of a third embodiment of an optical receiver. FIG. 10 depicts a configuration of a fourth embodiment of an optical receiver. In FIGS. 9 and 10, the same reference numerals are given to identical parts/components.

In FIG. 9, an optical device 11 is, for example, an avalanche photodiode, receives an optical input signal, converts the optical input signal to an electric signal (received signal), and provides the received signal to a pre-amplifier 12. The preamplifier 12 amplifies the received signal, and provides the received signal to an equalizer 13.

The equalizer 13 carries out waveform shaping on the received signal, and provides the received signal to an amplifier 14. The amplifier 14 is a limiter amplifier, discriminates a value (1 or 0) or data of the received signal by using a fixed discrimination point, and provides the received signal to the discrimination circuit 15. The discrimination circuit 15 extracts a clock signal from the received signal, takes the value of the received signal provided by the amplifier 14 at timing of the clock signal, and outputs thus-taken value (1 or 0) as data.

On the other hand, the optical device 11 driven by an APD bias voltage provided by an APD bias part 20 has an electric current signal that changes according to strength of the optical input signal. Therefore, a power monitoring part 19 monitors power of the optical input signal by using the electric current signal, and provides the monitored power of the optical input signal (power monitoring information) to an APD bias control part 21.

Figure 11A:
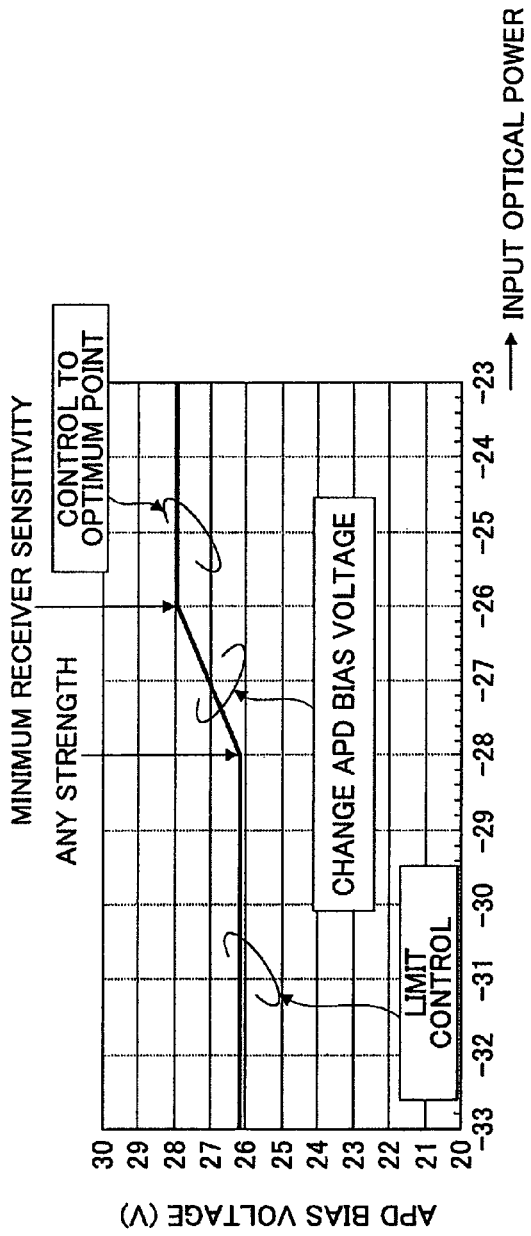
FIGS. 11A, 11B and 11C are characteristic diagrams illustrating the third and fourth embodiments.
Figure 11B:
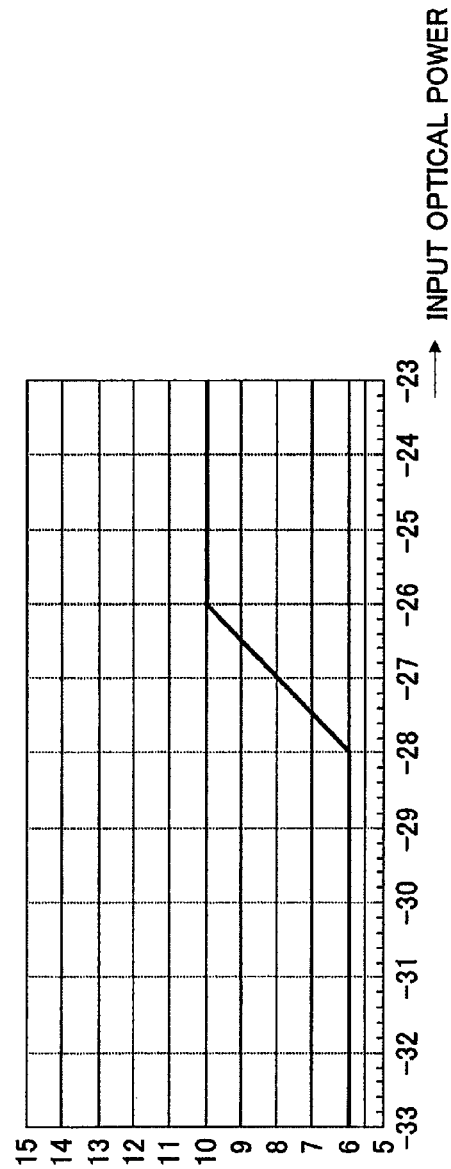
Figure 11C:
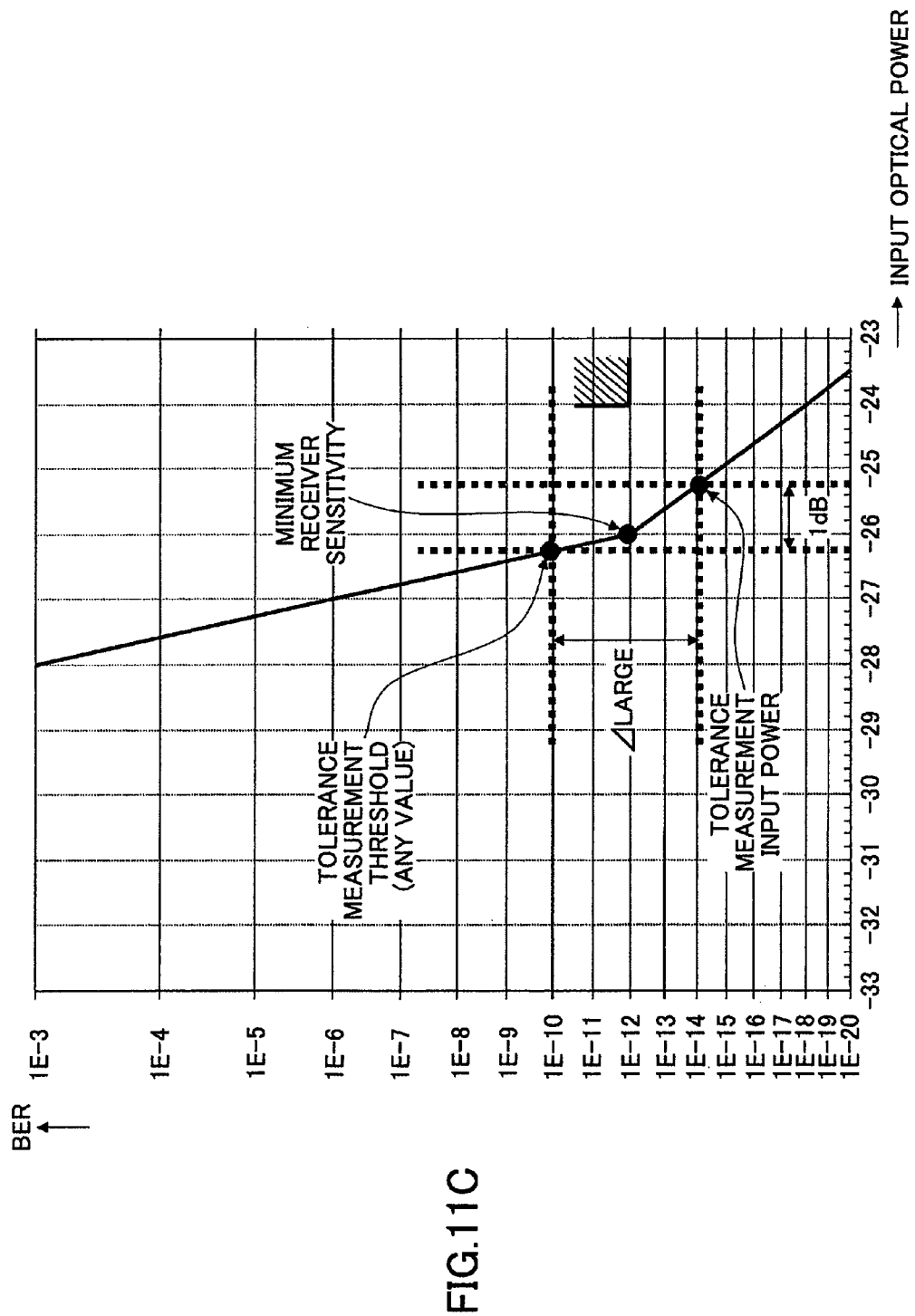

The APD bias control part 21 changes the APD bias voltage generated by the APD bias part 20 according to the power monitoring information of the input light (input optical signal). For example, as depicted in FIGS. 11A and 11C, for the input optical power (power of the input optical signal or the input light) of −26 dB or more, the APD bias voltage is controlled to be an optimum point (28 V). The input optical power=−26 dB is a value corresponding to a BER value (=1E-12) at minimum receiver sensitivity for when the APD bias voltage is controlled to be the optimum point (see FIG. 11C). For the input optical power from −26 dB to −28 dB (predetermined value), the APD bias voltage is decreased from 28 V to 26 V according to the input optical power, and thus, the APD bias voltage is shifted from the optimum point. For the input optical power equal to or less than −28 dB (predetermined value), the APD bias control part 21 carries out limit control to fix the APD bias voltage at 26 V. As a result of the APD bias voltage being thus changed, a multiplication factor M of the optical device 11 for the input optical power changes as depicted in FIG. 11B.

In the fourth embodiment depicted in FIG. 10, the discrimination circuit 15 provides the data discriminated by the discrimination circuit 15, to a BER monitoring part 16. The BER monitoring part 16 calculates a BER of the provided data, and provides the BER information to the APD bias control part 21.

The APD bias control part 21 then changes the APD bias voltage according to the power monitoring information of the input light and the BER information of the discriminated data. For example, as depicted in FIGS. 11A and 11C, the APD bias control part 21 controls the APD bias voltage to the optimum point (28 V), for the BER equal to or less than 1E-12. When the BER exceeds 1E-12 and thus becomes worse, the APD bias control part 21 changes the APD bias voltage from 28 V to 26 V according to the input optical power, to the input optical power of −28 dB (predetermined value). For the input optical power equal to or less than −28 dB (predetermined value), the APD bias control part 21 carries out limit control to fix the APD bias voltage at 26 V.

That is, in the third and fourth embodiments, the APD bias control part 21 carries out control as follows: In a case where the input optical power is less than sensitivity (minimum receiver sensitivity) at which a specific error level (BER=1E-12) is obtained, the APD bias voltage is shifted lower from the optimum point (the multiplication factor M is reduced), and thus, the input optical power/BER characteristics are made worse (the absolute value of the inclination is increased).

In the third and fourth embodiments, a solid line depicted in FIG. 11C denotes the input optical power/BER characteristics. An L-letter depicted in FIG. 11C denotes minimum receiver sensitivity (BER=1E-12) of the standard at which the input optical power of the optical signal of 10 Gbps is −24 dB.

In the input optical power/BER characteristics of FIG. 11C, the minimum receiver sensitivity is ensured through control of the APD bias control part 21 in which the multiplication factor M is controlled to be the optimum point for the input optical power equal to or more than −26 dB in which the BER is equal to or less than the BER value (=1E-12) at the minimum receiver sensitivity.

A jitter tolerance measurement threshold may be set to be larger (worse) than the BER value (=1E-12) at the minimum receiver sensitivity. Therefore, the input optical power at the jitter tolerance measurement threshold and the input optical power of a jitter tolerance measurement point may be increased accordingly. As a result, a difference in the BER may be increased between the jitter tolerance measurement threshold (tolerance measurement threshold) and the input optical power of the jitter tolerance measurement point (tolerance measurement input power). Thus, the jitter tolerance characteristics may be improved.

When the input optical power is equal to or less than the minimum receiver sensitivity and also, is equal to or less than the predetermined value (=−28 dB), or the BER is equal to or more than a second error level (=1E-3), the APD bias control part 21 controls the APD bias voltage to 26 V for the purpose of avoiding an out-of-synchronization state of a main signal, otherwise occurring due to an increase of the BER, and ensures the minimum receiver sensitivity.

Figure 12:
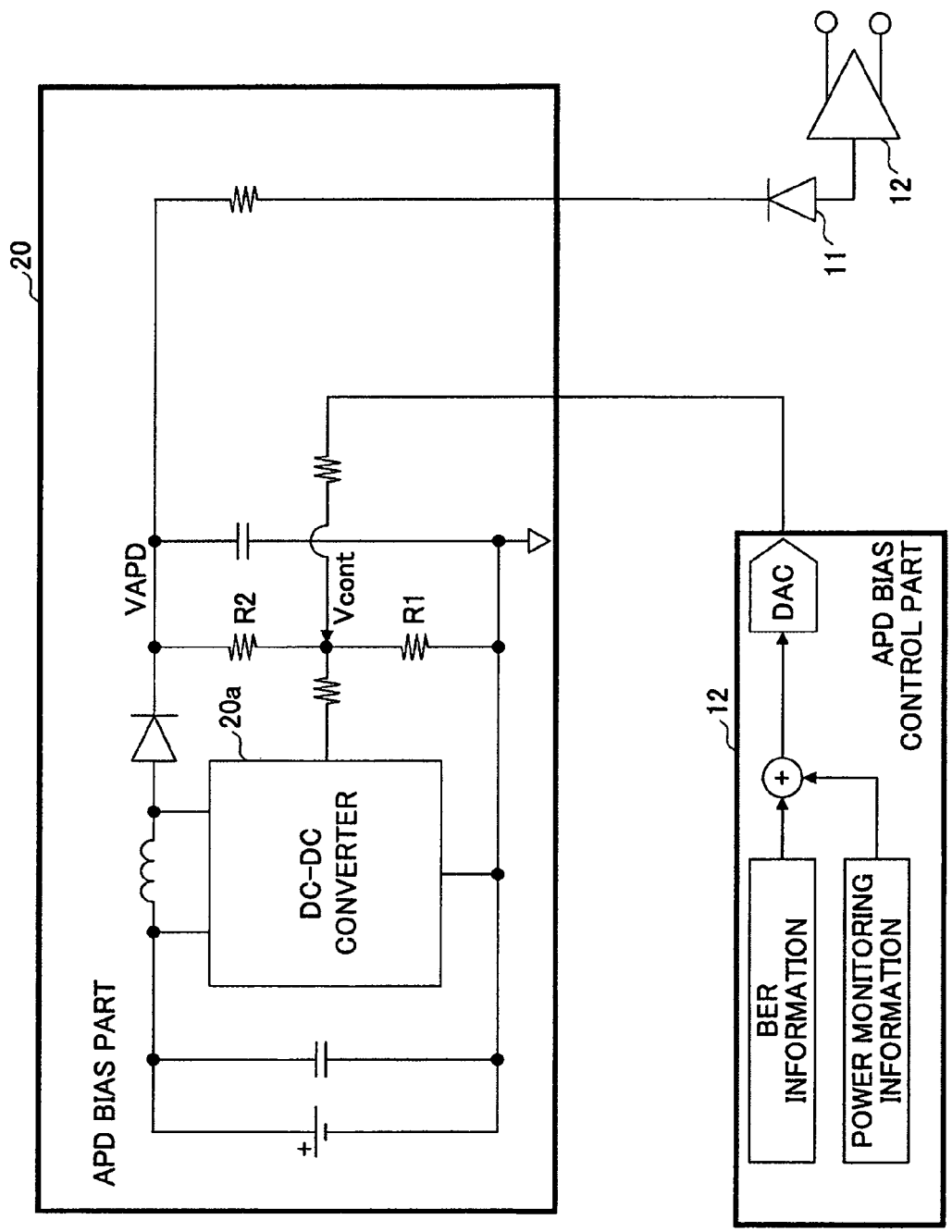
FIG. 12 is a detailed configuration diagram of one example of an APD bias part and an APD bias control part.

FIG. 12 depicts a detailed configuration of one example of the APD bias part 20 and the APD bias control part 21 depicted in FIG. 10. In FIG. 12, the APD bias control part 21 controls the APD bias voltage in the APD bias part 20 based on the power monitoring information of the input light and the BER information. That is, the APD bias control part 21 outputs an APD bias control voltage (Vcont) based on the power monitoring information and the BER information.

The APD bias part 20 includes a DC-DC converter 20a, as depicted in FIG. 12. In the APD bias part 20, the APD bias voltage (VAPD) is determined by the APD bias control voltage (Vcont) and resistors R1 and R2, as depicted below. Therefore, it is possible to control the APD bias voltage (VAPD) according to the BER information and the power monitoring information.

$$VAPD = Vcont \times (1 + R2/R1)$$

Fifth and Sixth Embodiments

Figure 13:
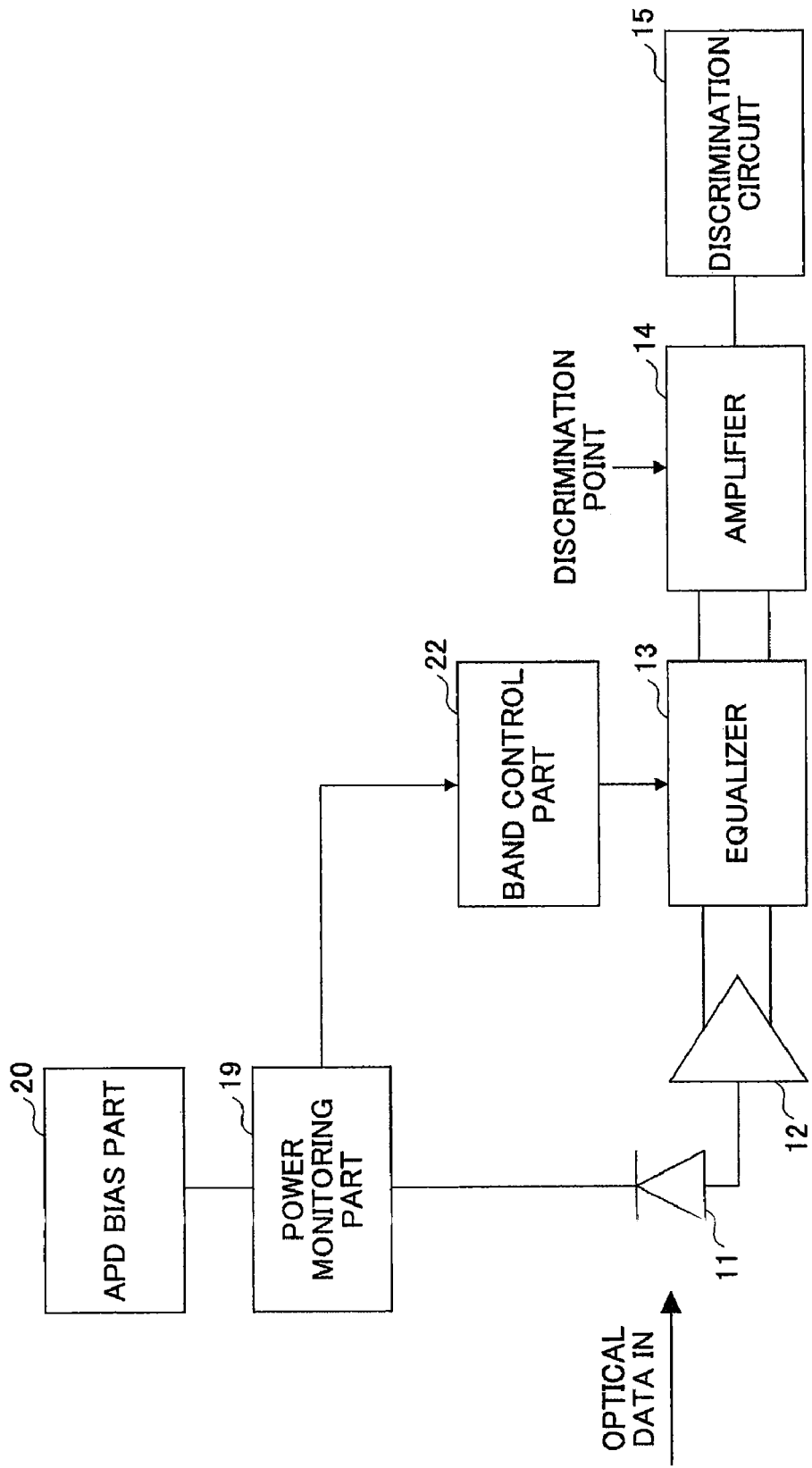
FIG. 13 is a configuration diagram of a fifth embodiment of an optical receiver.
Figure 14:
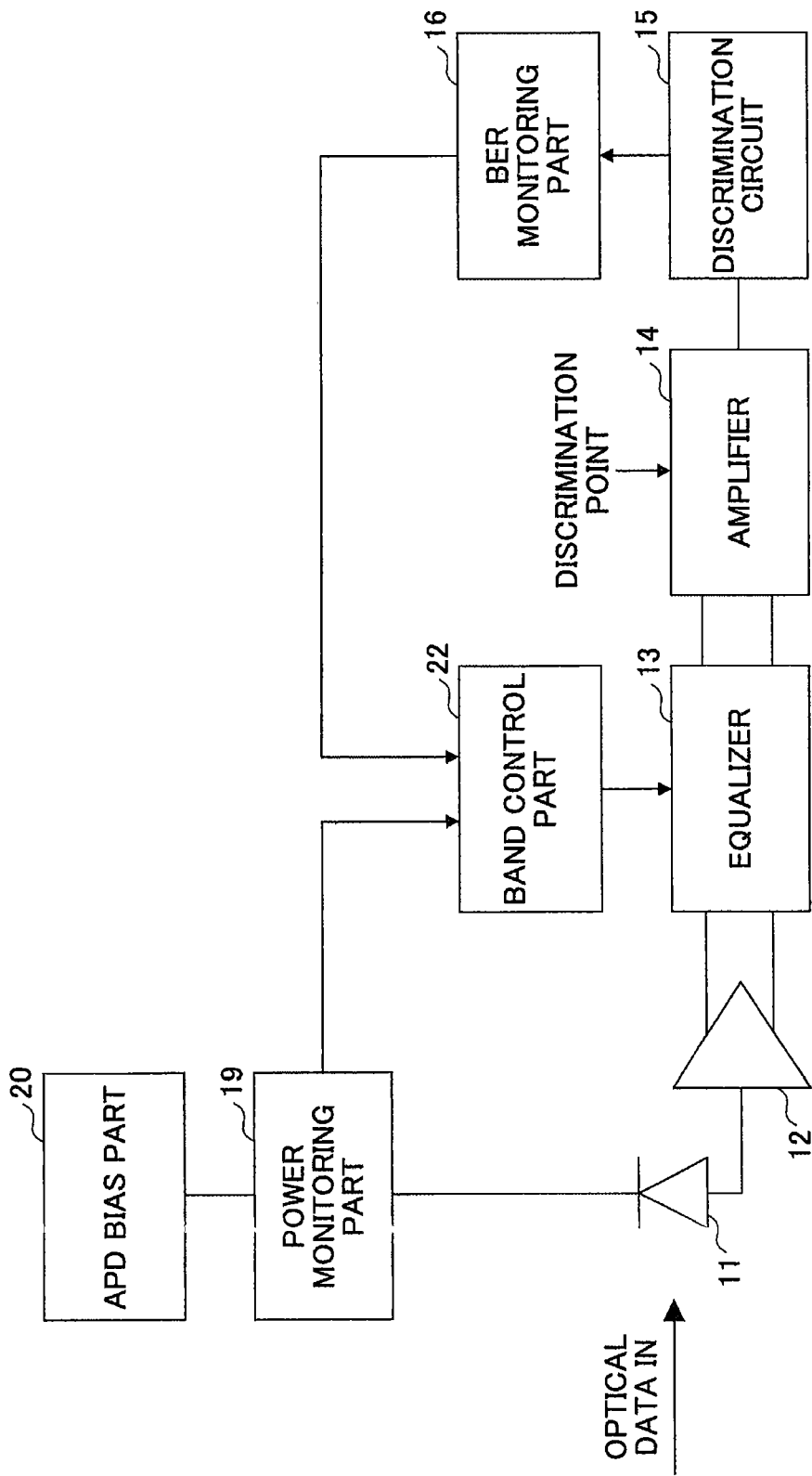
FIG. 14 is a configuration diagram of a sixth embodiment of an optical receiver.

FIG. 13 depicts a configuration of a fifth embodiment of an optical receiver. FIG. 14 depicts a configuration of a sixth embodiment of an optical receiver. In FIGS. 13 and 14, the same reference numerals are given to identical parts/components.

In FIG. 13, an optical device 11 is, for example, an avalanche photodiode, receives an optical input signal, converts the optical input signal to an electric signal (received signal), and provides the received signal to a pre-amplifier 12. The preamplifier 12 amplifies the received signal, and provides the received signal to an equalizer 13.

The equalizer 13 carries out waveform shaping on the received signal, and provides the received signal to an amplifier 14. The amplifier 14 is a limiter amplifier, discriminates a value (1 or 0) or data of the received signal by using a fixed discrimination point, and provides the received signal to the discrimination circuit 15. The discrimination circuit 15 extracts a clock signal from the received signal, takes the value of the received signal provided by the amplifier 14 at timing of the clock signal, and outputs thus-taken value (1 or 0) as data.

On the other hand, the optical device 11 driven by an APD bias voltage provided by an APD bias part 20 has an electric current signal that changes according to strength of the optical input signal. Therefore, a power monitoring part 19 monitors power of the optical input signal by using the electric current signal, and provides the monitored power of the optical input signal (power monitoring information) to a band control part 22.

Figure 15A:
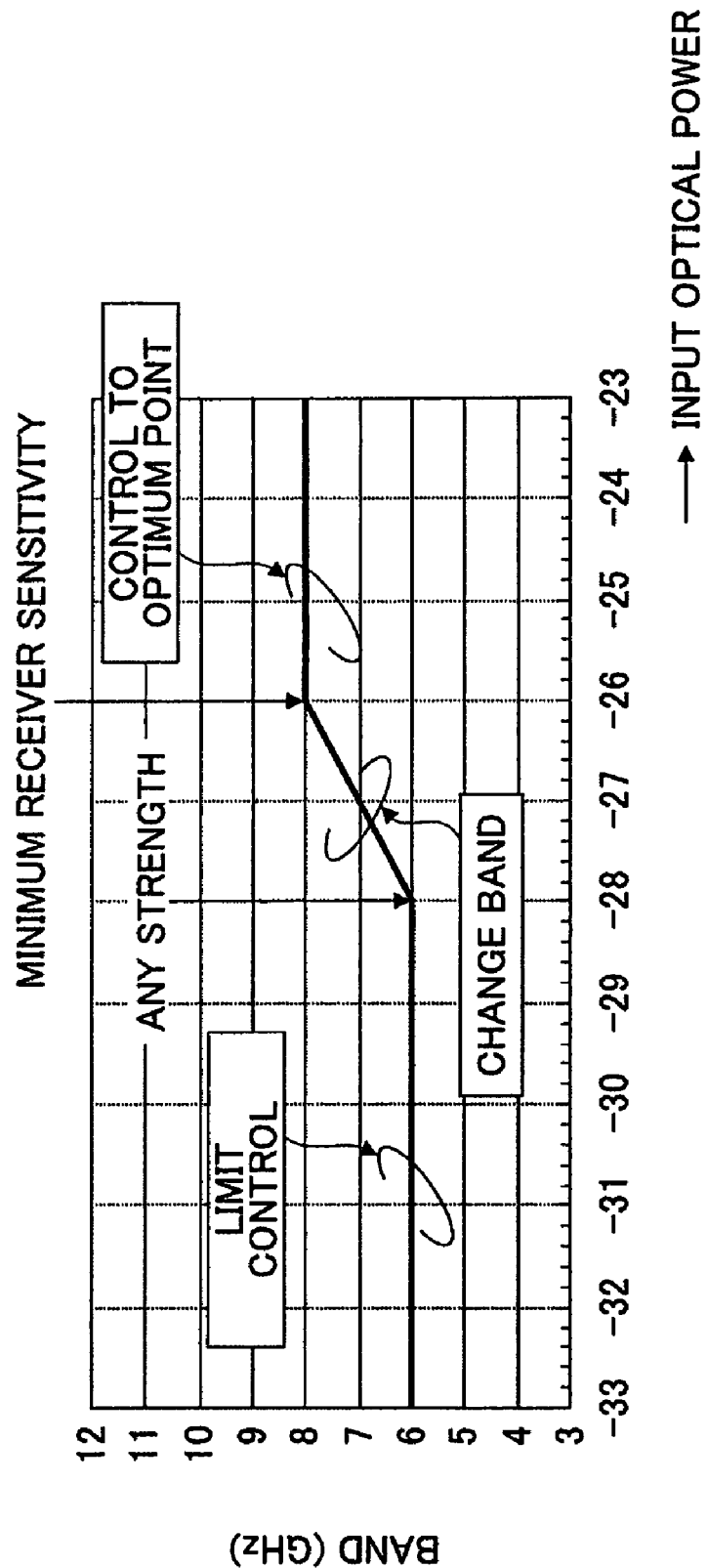
FIGS. 15A and 15B are characteristic diagrams illustrating the fifth and sixth embodiments.

The band control part 22 changes an equalization band in the equalizer 13, i.e., changes a cut-off frequency according to the power monitoring information of the input light (input optical signal). The equalization band is a frequency band defined by the cut-off frequency. For example, as depicted in FIG. 15A, for the input optical power (power of the input optical signal or the input light) of −26 dB or more, the cut-off frequency in the equalizer 13 is controlled to be an optimum point (8 GHz). The input optical power=−26 dB is a value corresponding to a BER value (=1E-12) at minimum receiver sensitivity for when the cut-off frequency is controlled to be the optimum point (see FIG. 15B). For the input optical power from −26 dB to −28 dB (predetermined value), the cut-off frequency is decreased from 8 GHz to 6 GHz according to the input optical power, and thus, the cut-off frequency is shifted from the optimum point. For the input optical power equal to or less than −28 dB (predetermined value), the band control part 22 carries out limit control to fix the cut-off frequency at 6 GHz.

Figure 2:
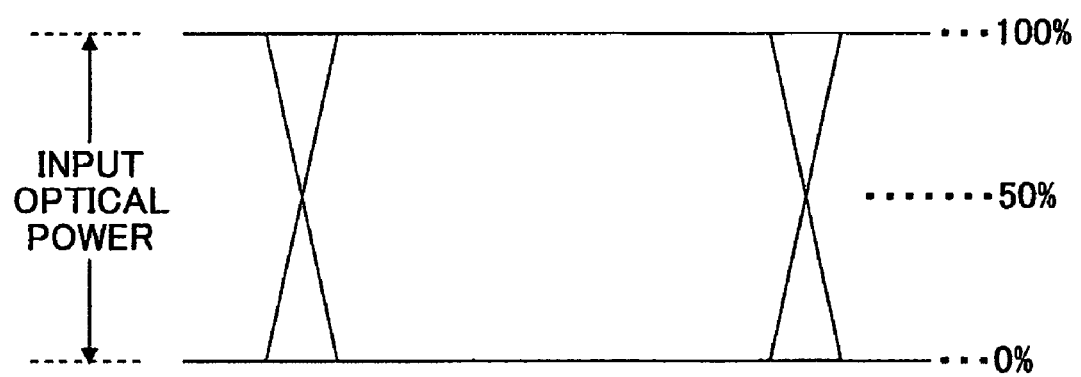
FIG. 2 depicts an eye aperture waveform.
Figure 16:
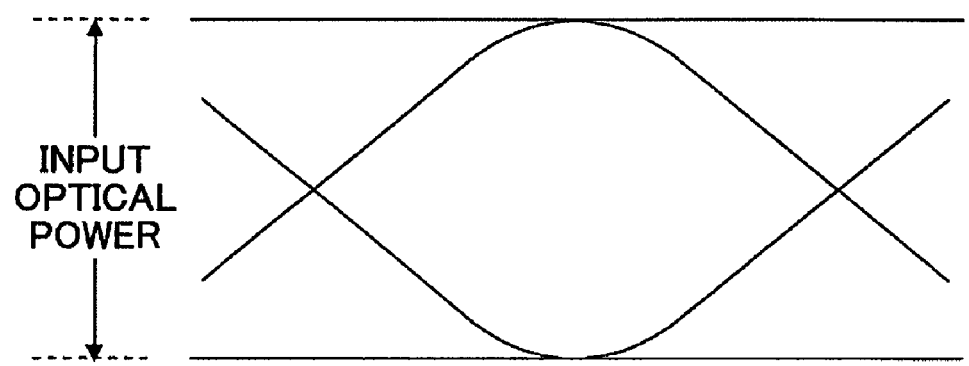
FIG. 16 depicts an eye aperture waveform.

It is noted that, in a case where an eye aperture waveform for when the cut-off frequency of the equalizer 13 is controlled to 8 GHz is one depicted in FIG. 2, an eye aperture waveform for when the cut-off frequency is controlled to 6 GHz is one depicted in FIG. 16. As can be seen from FIGS. 2 and 16 in a comparing manner, an eye aperture is narrowed when the cut-off frequency is controlled to 6 GHz.

That is, in the fifth embodiment, the band control part 22 carries out control as follows: In a case where the input optical power is lower than sensitivity (minimum receiver sensitivity) at which a specific error level (BER=1E-12) is obtained, the cut-off frequency in the equalizer 13 is shifted from the optimum point, and thus, the input optical power/BER characteristics are made worse (the absolute value of the inclination is increased).

In the fifth embodiment depicted in FIG. 14, the discrimination circuit 15 provides the data discriminated by the discrimination circuit 15, to a BER monitoring part 16. The BER monitoring part 16 calculates a BER of the provided data, and provides the BER information to the band control part 22.

Figure 15B:
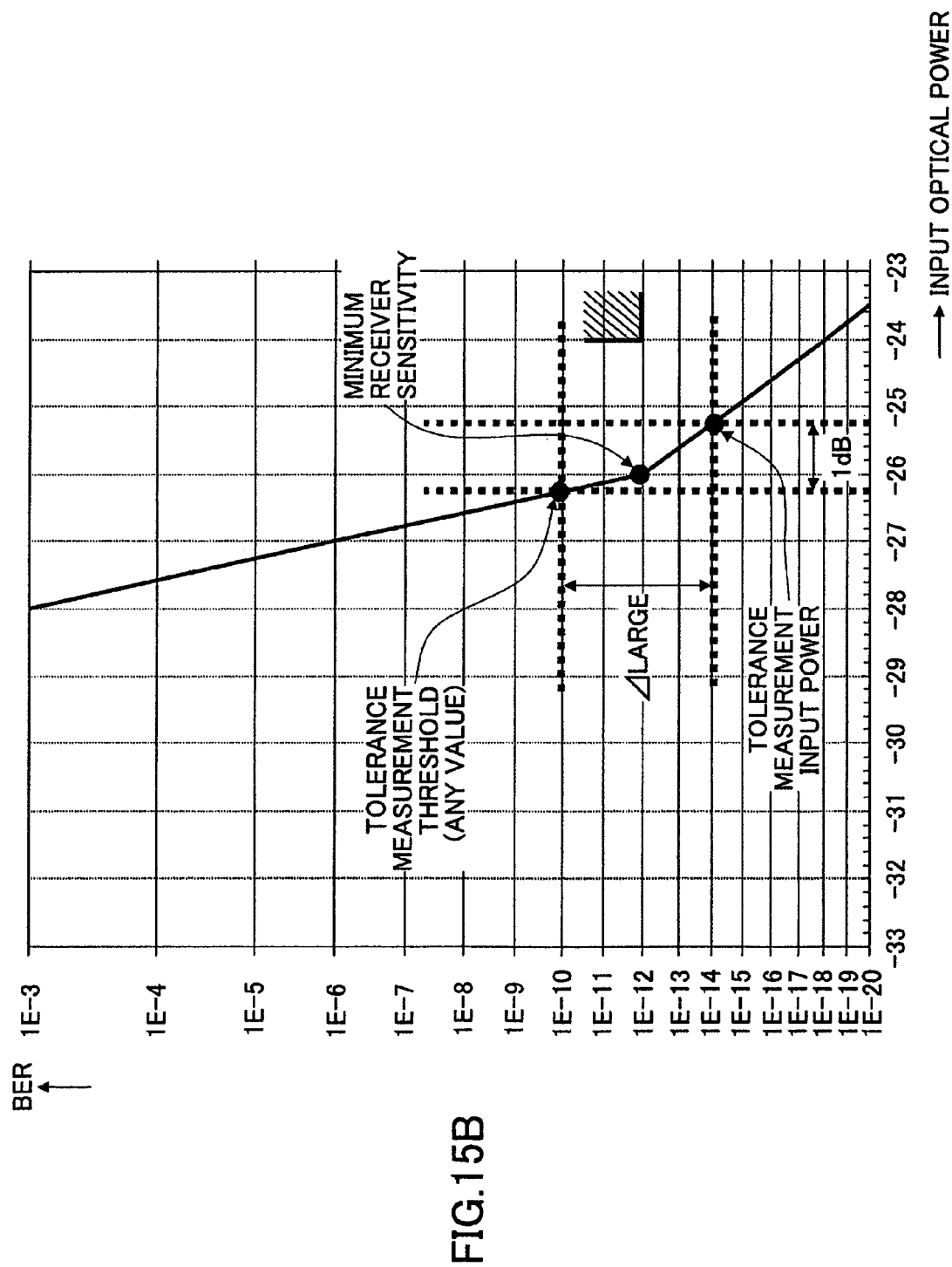

The band control part 22 then changes the cut-off frequency according to the power monitoring information of the input light and the BER information of the discriminated data. For example, as depicted in FIGS. 15A and 15B, the band control part 22 controls the cut-off frequency in the equalizer 13 to the optimum point (8 GHz), for the BER equal to or less than 1E-12. When the BER exceeds 1E-12 and thus becomes worse, the band control part 22 changes the cut-off frequency in the equalizer 13 from 8 GHz to 6 GHz according to the input optical power, to the input optical power of −28 dB (predetermined value). For the input optical power equal to or less than −28 dB (predetermined value), the band control part 22 carries out limit control to fix the cut-off frequency in the equivalent part equalizer 13 at 8 GHz.

That is, in the fifth and sixth embodiments, the band control part 22 carries out control as follows: In a case where the input optical power is lower than sensitivity (minimum receiver sensitivity) at which a specific error level (BER=1E-12) is obtained, the cut-off frequency in the equalizer 13 is reduced.

In the fifth and sixth embodiments, a solid line depicted in FIG. 15B denotes the input optical power/BER characteristics. An L-letter depicted in FIG. 15B denotes minimum receiver sensitivity (BER=1E-12) of the standard at which the input optical power of the optical signal of 10 Gbps is −24 dB.

In the input optical power/BER characteristics of FIG. 15B, the minimum receiver sensitivity is ensured through control of the band control part 22 in which the cut-off frequency in the equalizer 13 is controlled to be the optimum point for the input optical power equal to or more than −26 dB in which the BER is equal to or less than the BER value (=1E-12) at the minimum receiver sensitivity.

A jitter tolerance measurement threshold may be set to be larger (worse) than the BER value (=1E-12) at the minimum receiver sensitivity. Therefore, the input optical power at the jitter tolerance measurement threshold and the input optical power of a jitter tolerance measurement point may be increased accordingly. As a result, a difference in the BER may be increased between the jitter tolerance measurement threshold (tolerance measurement threshold) and the input optical power of the jitter tolerance measurement point (tolerance measurement input power). Thus, the jitter tolerance characteristics may be improved.

When the input optical power is equal to or less than the minimum receiver sensitivity and also, is equal to or less than the predetermined value (=−28 dB), or the BER is equal to or more than a second error level (=1E-3), the band control part 22 controls the cut-off frequency in the equalizer 13 to 6 GHz for the purpose of avoiding an out-of-synchronization state of a main signal, otherwise occurring due to an increase of the BER, and ensures the minimum receiver sensitivity.

Figure 17:
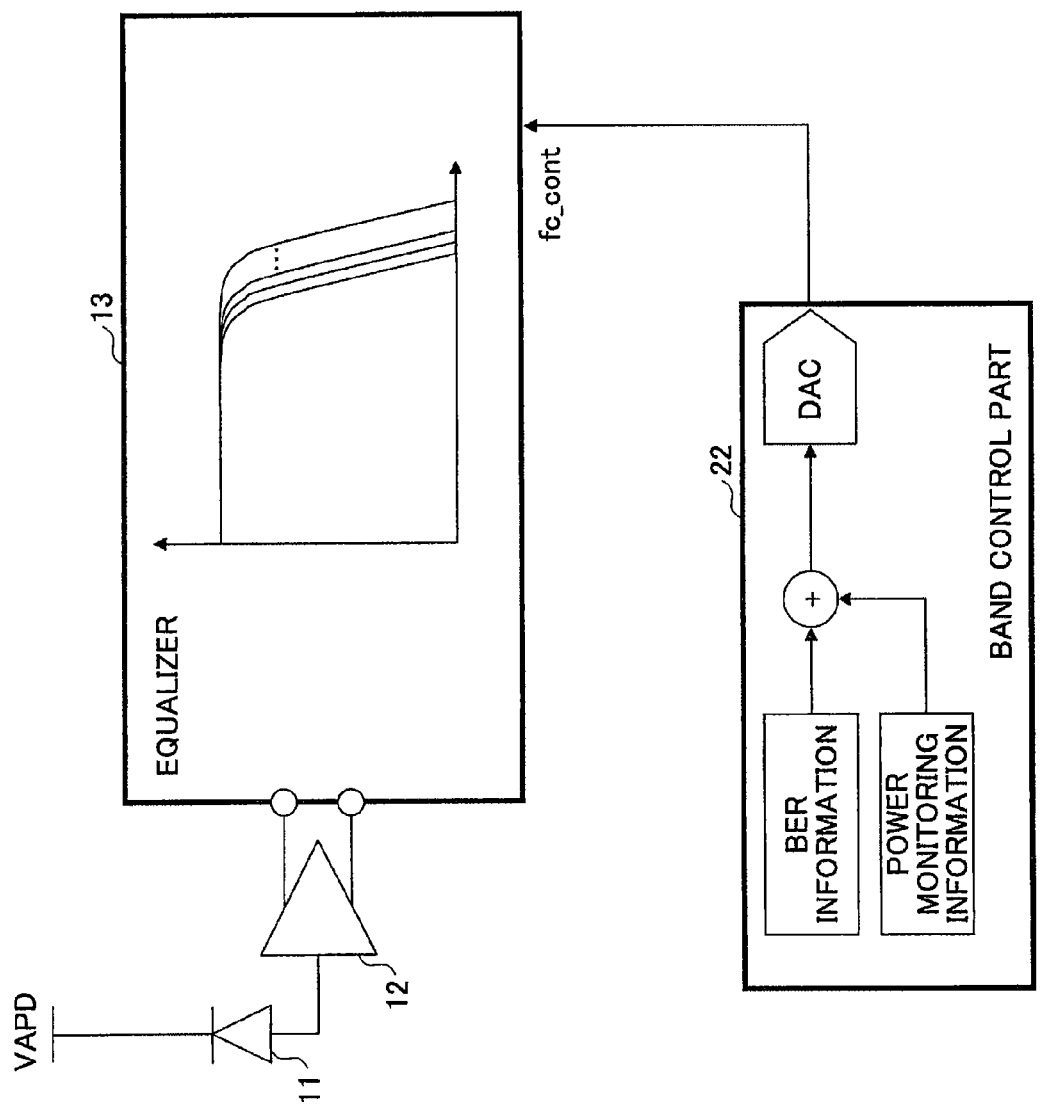
FIG. 17 is a detailed configuration diagram of an example of an equalizer and a band control part.

FIG. 17 depicts a detailed configuration of one example of the equalizer 13 and the band control part 22 depicted in FIG. 14. In FIG. 17, the band control part 22 controls the cut-off frequency in the equalizer 13 based on the power monitoring information of the input light and the BER information. That is, the band control part 22 outputs a band control voltage (fc_cont) based on the power monitoring information and the BER information.

Figure 18B:
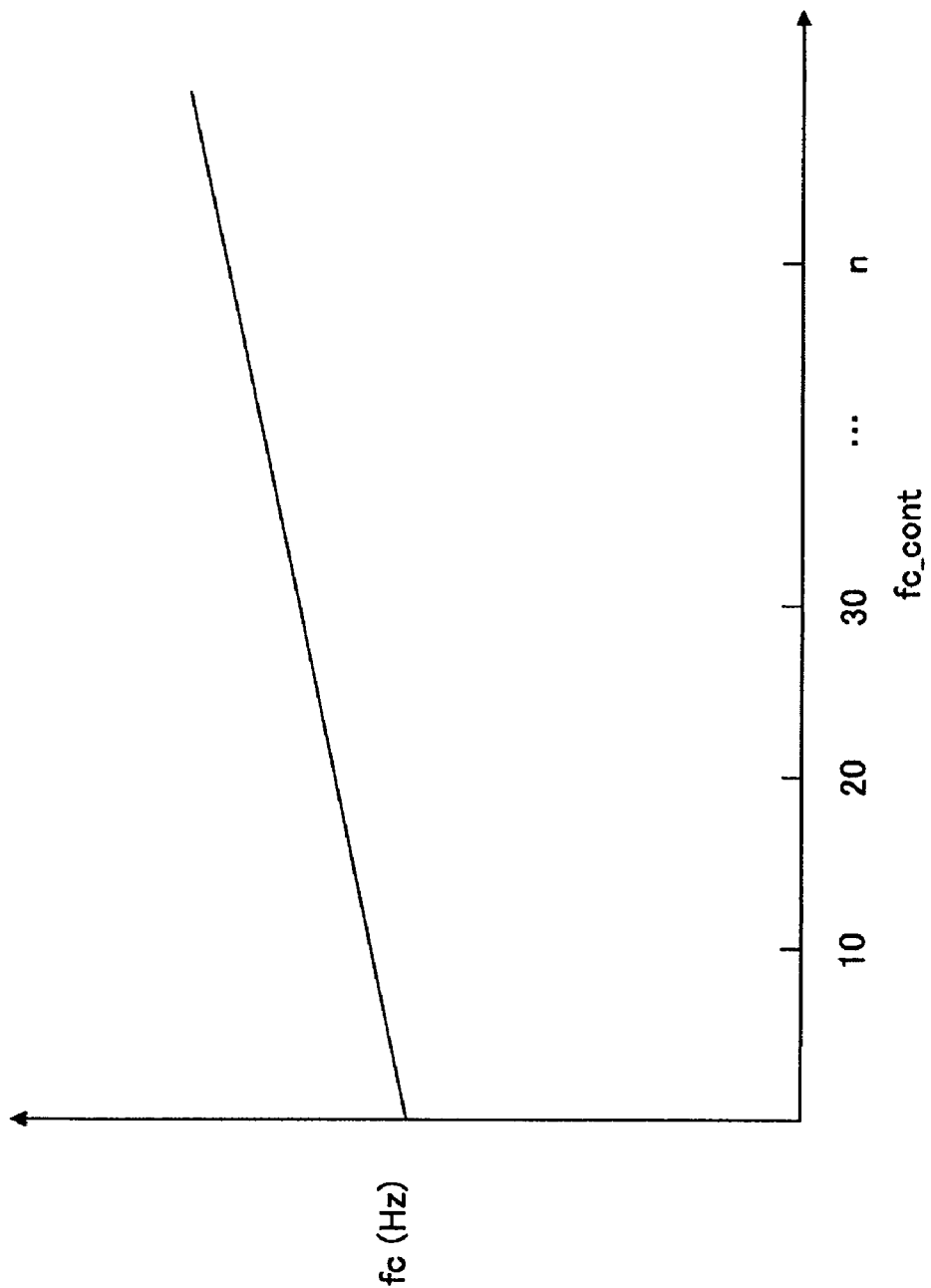

The equalizer 13 has frequency/gain characteristics depicted in FIG. 18A by using the band control voltage (fc_cont) as a parameter, and has band control voltage (fc_cont)/cut-off frequency (fc) characteristics depicted in FIG. 18B. Accordingly, in the equalizer 13, the cut-off frequency (fc) is changed, and thus, an equalization band is changed, according to the band control voltage (fc_cont).

Thus, in the first through sixth embodiments of the present invention described above, degradation in the receiving characteristics does not occur for the input light having the input optical power equal to or more than the minimum receiver sensitivity, even when a countermeasure to increase the jitter tolerance is carried out. Further, for the input light having the input optical power equal to or less than the minimum receiver sensitivity, although the receiving characteristics may be degraded, no problem occurs since, in the first place, the input optical power is equal to or less than the minimum receiver sensitivity.

The jitter tolerance measurement threshold may be set to be higher (worse) than the BER value at the minimum receiver sensitivity. Therefore, for the input light having the input optical power equal to or less than the minimum receiver sensitivity, the discrimination point may be set with it being shifted from the optimum point, the APD bias voltage may be set lower, or the cut-off frequency in the equalizer may be set lower (thus, the equalization band may be set narrower). Thus, the input optical power at the jitter tolerance measurement threshold may be increased, thereby the input optical power at the jitter tolerance measurement point may be increased, and thus, the error rate at the jitter tolerance measurement point may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that various changes, substitutions, and alterations could be made hereto without departing from the spirit and scope of the invention.

What is claimed is:

1. An optical receiver, comprising:
    an optical device configured to receive input light and convert the input light to an electric signal;
    an equalizer configured to carry out waveform shaping on the electric signal;
    an amplifier configured to amplify the electric signal;
    a discrimination part configured to discriminate data of the electric signal;
    an input optical power detecting part configured to detect input optical power of the input light; and
    a control part configured to increase an absolute value of a rate of change of an error rate in the electric signal with respect to the input optical power when the input optical power detected by the input optical power detecting part is equal to or less than a value corresponding to minimum receiver sensitivity.

2. The optical receiver as claimed in claim 1, wherein:
    the control part is configured to increase the absolute value of the rate of change of the error rate with respect to the input optical power by shifting a discrimination point used by the discrimination part to discriminate data of the electric signal from an optimum point according to the input optical power, when the input optical power detected by the input optical power detecting part is equal to or less than the value corresponding to the minimum receiver sensitivity.

3. The optical receiver as claimed in claim 2, further comprising:
    an error rate detecting part configured to detect the error rate of the electric signal, the data of the electric signal being discriminated by the discrimination part, wherein
    the control part shifts the discrimination point from the optimum point according to the input optical power, when the error rate detected by the error rate detecting part is equal to or less than the minimum receiver sensitivity.

4. The optical receiver as claimed in claim 2, wherein:
    the control part keeps the discrimination point at a fixed point, when the input optical power detected by the input optical power detecting part is equal to or less than a predetermined value that is smaller than the value corresponding to the minimum receiver sensitivity.

5. The optical receiver as claimed in claim 1, wherein:
    the control part is configured to increase the absolute value of the rate of change of the error rate with respect to the input optical power by lowering a bias voltage in the optical device from an optimum point according to the input optical power, when the input optical power detected by the input optical power detecting part is equal to or less than the value corresponding to the minimum receiver sensitivity.

6. The optical receiver as claimed in claim 5, further comprising:

an error rate detecting part configured to detect the error rate of the electric signal, the data of the electric signal being discriminated by the discrimination part, wherein the control part lowers the bias voltage from the optimum point according to the input optical power, when the error rate detected by the error rate detecting part is equal to or less than the minimum receiver sensitivity.

7. The optical receiver as claimed in claim 5, wherein:

the control part keeps the bias voltage at a fixed voltage, when the input optical power detected by the input optical power detecting part is equal to or less than a predetermined value that is smaller than the value corresponding to the minimum receiver sensitivity.

8. The optical receiver as claimed in claim 1, wherein:

the control part is configured to increase the absolute value of the rate of change of the error rate with respect to the input optical power by lowering a cut-off frequency from an optimum point to narrow an equalization band in the equalizer according to the input optical power, when the input optical power detected by the input optical power detecting part is equal to or less than the value corresponding to the minimum receiver sensitivity.

9. The optical receiver as claimed in claim 8, further comprising:

an error rate detecting part configured to detect the error rate of the electric signal, the data of the electric signal being discriminated by the discrimination part, wherein the control part lowers the cut-off frequency from the optimum point to narrow the equalization band according to the input optical power, when the error rate detected by the error rate detecting part is equal to or less than the minimum receiver sensitivity.

10. The optical receiver as claimed in claim 8, wherein:

the control part keeps the equalization band at a fixed band, when the input optical power detected by the input optical power detecting part is equal to or less than a predetermined value that is smaller than the value corresponding to the minimum receiver sensitivity.

11. A jitter tolerance control method in an optical receiver receiving input light and converting the input light to an electric signal in an optical device, carrying out waveform shaping on the electric signal, amplifying the electric signal, and discriminating data of the electric signal, the jitter tolerance control method comprising:

detecting input optical power of the input light; and increasing an absolute value of a rate of change of an error rate in the electric signal with respect to the input optical power when the input optical power detected in the detecting is equal to or less than a value corresponding to minimum receiver sensitivity.

12. The jitter tolerance control method as claimed in claim 11, wherein:

said increasing the absolute value of the rate of change of the error rate with respect to the input optical power shifts a discrimination point used in the discriminating from an optimum point according to the input optical power, when the input optical power detected in the detecting is equal to or less than the value corresponding to the minimum receiver sensitivity.

13. The jitter tolerance control method as claimed in claim 11, wherein:

said increasing the absolute value of the rate of change of the error rate with respect to the input optical power lowers a bias voltage in the optical device from an optimum point according to the input optical power, when the input optical power detected in the detecting is equal to or less than the value corresponding to the minimum receiver sensitivity.

14. The jitter tolerance control method as claimed in claim 11, wherein:

said increasing the absolute value of the rate of change of the error rate with respect to the input optical power lowers a cut-off frequency to narrow an equalization band used in an equalizer that carries out waveform shaping on the electric signal from an optimum point according to the input optical power, when the input optical power detected in the detecting is equal to or less than the value corresponding to the minimum receiver sensitivity.

* * * * *

UNITED STATES PATENT AND TRADEMARK OFFICE
CERTIFICATE OF CORRECTION

PATENT NO. : 8,374,513 B2  Page 1 of 1
APPLICATION NO. : 12/662470
DATED : February 12, 2013
INVENTOR(S) : Yasushi Koiwai It is certified that error appears in the above-identified patent and that said Letters Patent is hereby corrected as shown below:

Title Page item [73] (Assignee); Line 1, Under (73) Assignee, delete "Fujitsu Optical Component Limited, Kawasaki (JP)" and insert -- Fujitsu Optical Components Limited, Kawasaki (JP) --, therefor.

Signed and Sealed this
Fourteenth Day of May, 2013

Teresa Stanek Rea
*Acting Director of the United States Patent and Trademark Office*